(12) United States Patent
Xu et al.

(10) Patent No.: US 7,513,175 B2
(45) Date of Patent: Apr. 7, 2009

(54) DECORATIVE OUTER WRAP SUBASSEMBLY AND METHOD OF FABRICATION

(75) Inventors: Xiaoping Xu, Rochester Hills, MI (US); Byron Spencer, Bloomfield, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 633 days.

(21) Appl. No.: 11/256,515

(22) Filed: Oct. 24, 2005

(65) Prior Publication Data
US 2007/0137413 A1 Jun. 21, 2007

(51) Int. Cl.
*B62D 1/04* (2006.01)
(52) U.S. Cl. .......................................................... 74/552
(58) Field of Classification Search ..................... 74/552
See application file for complete search history.

(56) References Cited

U.S. PATENT DOCUMENTS

| | | | |
|---|---|---|---|
| 4,581,954 | A | 4/1986 | Uchida |
| 5,840,144 | A | 11/1998 | Schumacher et al. |
| 6,012,354 | A | 1/2000 | Futschik et al. |
| 6,249,970 | B1 | 6/2001 | Cattaneo |
| 6,360,632 | B1 | 3/2002 | Papandreou |
| 6,401,567 | B1 | 6/2002 | Sugiyama et al. |
| 6,418,814 | B1 | 7/2002 | Emeneth et al. |
| 6,443,030 | B1 | 9/2002 | Schuler |
| 6,494,114 | B1 | 12/2002 | Schuler |
| 6,499,377 | B1 | 12/2002 | Schuler |
| 6,532,843 | B2 | 3/2003 | Chang |
| 6,564,674 | B2 | 5/2003 | Nagata et al. |
| 6,622,591 | B2 | 9/2003 | Albayrak et al. |
| 6,637,289 | B2 | 10/2003 | Kreuzer et al. |
| 6,644,145 | B2 | 11/2003 | Albayrak et al. |
| 6,651,526 | B1 | 11/2003 | Imaizumi et al. |
| 6,668,682 | B1 | 12/2003 | Emeneth et al. |
| 6,668,683 | B2 | 12/2003 | Fleckenstein |
| 6,761,086 | B2 | 7/2004 | Kreuzer et al. |
| 6,877,397 | B2 | 4/2005 | Albayrak et al. |
| 2001/0006011 | A1 | 7/2001 | Testa et al. |
| 2002/0017157 | A1 | 2/2002 | Kreuzer et al. |
| 2002/0026850 | A1 | 3/2002 | Albayrak et al. |
| 2002/0029650 | A1 | 3/2002 | Emeneth et al. |
| 2003/0075003 | A1 | 4/2003 | Tanabe et al. |
| 2003/0192397 | A1 | 10/2003 | Kreuzer et al. |

(Continued)

FOREIGN PATENT DOCUMENTS

CN 1159182 C 7/2004

(Continued)

*Primary Examiner*—Vicky A Johnson
(74) *Attorney, Agent, or Firm*—Lonnie Drayer

(57) ABSTRACT

An intermediate article of manufacture forming an outer wrap subassembly having a leather, simulated leather or leather equivalent pliable component and one or more decorative components adhered to or otherwise attached to said leather, simulated leather or leather equivalent pliable component and one or more securing components is disclosed. The one or more securing components adheres or attaches the one or more decorative components to form the subassembly. The subassembly creates a unique attachment capability such that the crevice formed between the leather and the decorative component is maintained at a minimal gap and the radius of curvature of the leather component when assembled to the underlying article to form the final assembly has a radius of curvature of less than 2 mm, preferably 1.5 mm or less.

10 Claims, 18 Drawing Sheets

U.S. PATENT DOCUMENTS

| | | |
|---|---|---|
| 2003/0213332 A1 | 11/2003 | Hayashi et al. |
| 2004/0050204 A1 | 3/2004 | Albayrak et al. |
| 2004/0154428 A1 | 8/2004 | Albayrak et al. |
| 2005/0040158 A1 | 2/2005 | Bamy Bamy et al. |
| 2005/0050981 A1 | 3/2005 | Warhover et al. |
| 2005/0082269 A1 | 4/2005 | Haag et al. |
| 2006/0053956 A1* | 3/2006 | Kreuzer ........................ 74/552 |

FOREIGN PATENT DOCUMENTS

| | | |
|---|---|---|
| EP | 1 063 146 A1 | 12/2000 |
| JP | 10-297501 | 11/1998 |
| JP | 1029750 | 11/1998 |
| JP | 2000-085586 | 3/2000 |
| JP | 2000-127982 | 5/2000 |
| JP | 2000-142424 | 5/2000 |
| JP | 2000-225951 | 8/2000 |
| JP | 2001-055150 | 2/2001 |
| JP | 2001-213327 | 8/2001 |
| JP | 2002-087282 A | 3/2002 |
| JP | 2004-149112 | 5/2004 |
| KR | 20-0236013 Y1 | 10/2001 |
| KR | 20-0339744 Y1 | 1/2004 |
| WO | WO 97/43164 | 11/1997 |
| WO | WO 2005/016705 A1 | 2/2005 |

* cited by examiner

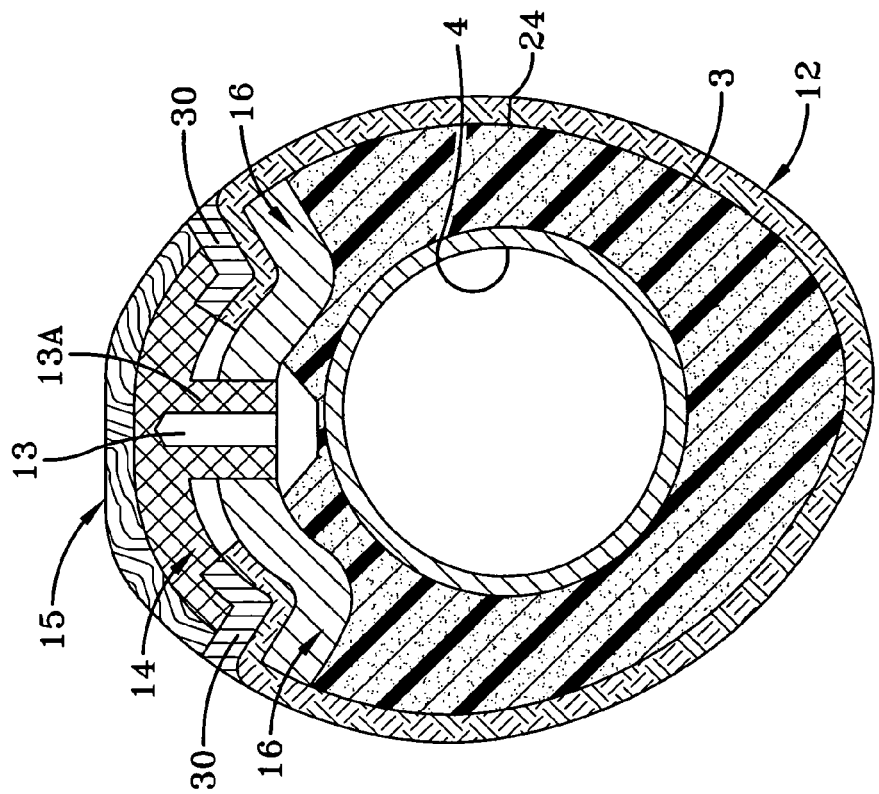
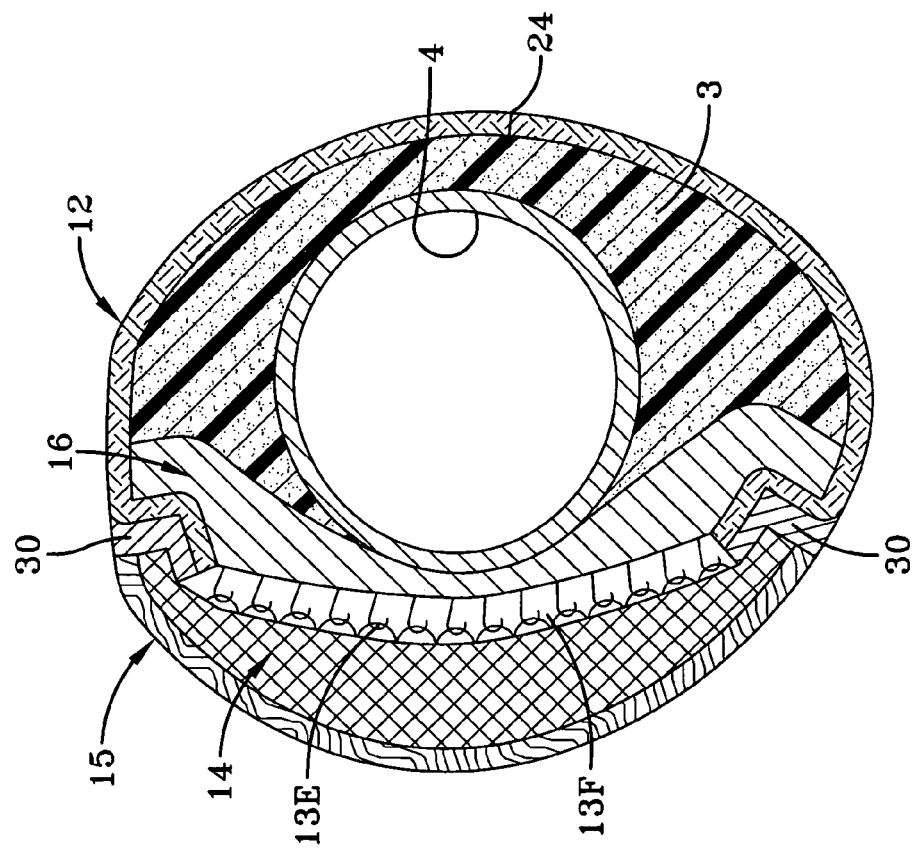

DECORATIVE OUTER WRAP SUBASSEMBLY AND METHOD OF FABRICATION

FIELD OF THE INVENTION

This invention relates to an intermediate article of manufacture and it's method of manufacture. More particularly the article is a decorative outer wrap for a vehicle component, the vehicle component generally being within the interior or passenger compartment of the vehicle.

BACKGROUND OF THE INVENTION

The interior compartments of vehicles are commonly decorated with luxurious items such as leather appointments, wood grain paneling and other features to provide a luxurious and more aesthetically appealing interior for the passengers. It is important that these components provide a special aesthetic appeal and help to sell the product. Consumers are extremely demanding, as are the manufacturers. The quality of these components and durability must be such that they survive the normal wear and tear provided with constant use. One such component of particular interest is the steering wheel assembly. The steering wheel assembly and other components such as the gear shift, door paneling, windows, visors, dash, center console and even the seats can be decorated with leather appointments or simulated leather or leather equivalents to give the appearance of a luxurious feel. In combination with leather it is often desirable to provide other decorative elements either embedded in the leather or on the surface of the leather such that the leather is aesthetically improved by the addition of these decorative elements.

Oftentimes the decorative elements are wood, wood grain or wood simulated plastic components that have a wood grain pattern painted or printed on them. Alternatively the decorative component can be hard lacquer painted or chrome plated. All of which are provided in combination with leather appointments or leather simulated appointments to provide a more luxurious appearance.

In US 2002/0017157 A1 and US 2002/0026850 A1 a steering wheel is provided with a decorative element. The one or more decorative elements are used in combination with an outer leather wrap. These components while providing the necessary appeal are assembled on the steering wheel at the time of final assembly. These components are placed on the steering wheel rim. The steering wheel itself, commonly called an armature, has a center hub and several spokes extending from the hub and contacting an annular rim. The rim is generally coated in a polyurethane soft material that provides a very comfortable feel to the driver. This undercoating of urethane, while providing a very comfortable feel, also provides a surface that makes it difficult to wrap the leather component to the extent that there's no rigid surface for which the leather can be forcibly stretched upon. As such the urethane tends to deform locally in any location subject to force or pressure. This is particularly true in the case of these prior patents wherein the assembly is done at the final stage and the components are all applied directly onto the polyurethane coated rim of the steering wheel. Once assembled the rim and leather components are affixed thereto in such a fashion that should there be any damage or nick to the leather or to the decorative component the entire wheel assembly could be lost. This is particularly costly in that the armatures are substantially expensive and are a very sophisticated component in their own right. Therefore, it is of particular interest that when these assemblies are done they are in a state where the outer wrapping and decorative component are at minimal risk to damage or scratching prior to assembly unlike these prior art publications.

A second and equally more important problem associated with the assembly of decorative components onto steering wheels coated with polyurethane is that the leather is being stretched around the components which creates a large crevice; this crevice is generally at the interface between the edge of the decorative component and the leather. Attempts to retain the leather provides a reasonably way of assembly, however, they provide no way of ensuring that the crevice is minimized. While this crevice may seem of nominal interest at the time of assembly, during use it is an area where oil, grease and grit from the driver's hands and any other dirt can get caught leaving a very distinctive line of debris within the crevice that is visually noticeable and very difficult to clean. In particular the prior art radius of curvature of the leather adjacent a decorative component is substantially greater than 2 mm. This crevice created by this radius of curvature is unfortunate, but has been accepted in the industry as a necessary evil. The present invention provides an intermediate article of manufacture that can be pre-assembled, stored and subsequently at the last stage of final assembly be attached to a steering wheel, a gear shift or other component in such a fashion that should there be any defects in the subassembly the entire final assembly does not have to be discarded. The present invention further provides a more secure way of retaining the decorative element while improving the appearance at the interface and along the edges of the decorative component. This has not been achieved in the prior art.

SUMMARY OF THE INVENTION

There is provided in accordance with the present invention an intermediate article of manufacture forming an outer wrap subassembly having a leather, simulated leather or leather equivalent pliable component and one or more decorative components adhered to or otherwise attached to said leather, simulated leather or leather equivalent pliable component and one or more securing components is disclosed. The one or more securing components adheres or attaches the one or more decorative components to form the subassembly. The subassembly creates a unique attachment capability such that the crevice formed between the leather and the decorative component is maintained at a minimal gap and the radius of curvature of the leather component when assembled to the underlying article to form the final assembly has a radius of curvature approximately equal to the thickness of the leather used typically less than 2 mm, but preferably 1.5 mm or less.

BRIEF DESCRIPTION OF THE DRAWINGS

FIGS. 13-23 show various means of attaching the subassembly of the present invention and adhering the subassembly to the steering wheel rim at specific orientations.

DETAILED DESCRIPTION OF THE INVENTION

Figure 1:
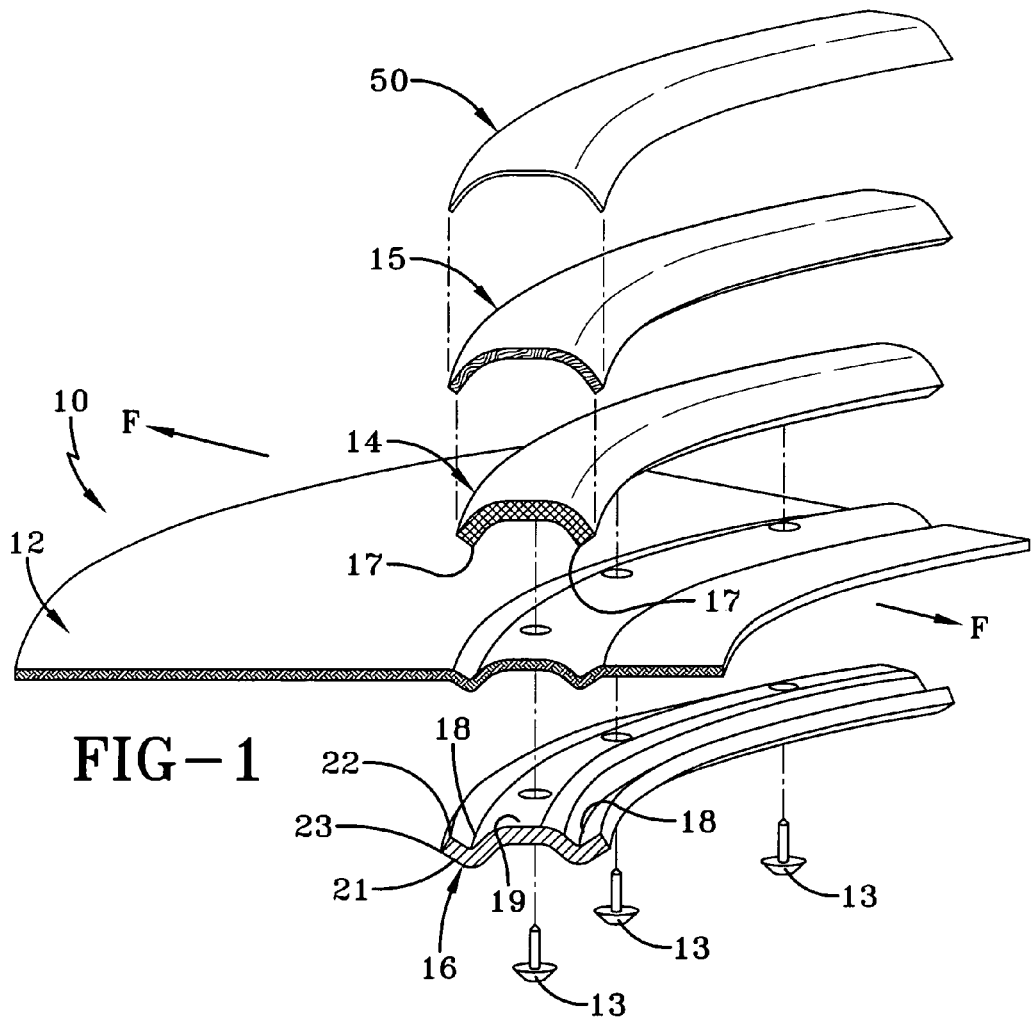
FIG. 1 is an exploded view of the subassembly according to a first embodiment of the invention.

With reference to FIG. 1, the intermediate article of manufacture forming an outer wrap subassembly 10 for mounting onto a steering wheel is shown. As shown the subassembly 10 has a width sufficient to cover only a portion of an outer rim of a steering wheel. It is noted that these subassemblies 10 can be provided such that they cover only a small arcuate section of a steering wheel or can in fact be provided such that the subassembly can cover the entire 360 degree perimeter of a steering wheel assembly, thus covering the entire outer rim with a single subassembly 10 if so desired. As shown the leather, simulated leather or leather equivalent pliable component 12 is shown between the outer base structure 14 and the underlying locking structure 16. As used herein, the leather, simulated leather or leather equivalent pliable component 12 may simply be referred to as leather 12 or pliable component 12. Generally the thickness of the leather component 12 is about 1.2 mm but can be greater depending on the application. As illustrated, the outer base structure 14 can have an outer covering 15 made of wood, veneer, printed pattern or simulated wood grain or any other decorative feature applied to it. This can be done either by painting it directly onto the base structure 14 or having the outer layer 15 applied or otherwise affixed to the base structure 14 as shown. In cases where the decorative layer 15 is painted, printed or otherwise applied as a coating on the surface of the outer base structure 14 then the outer base structure 14 actually can be considered the decorative component for the purposes of the invention. Accordingly in the illustrated exemplary embodiments the decorative component 15 is shown as a separate element that is bonded or otherwise adhered to the outer base structure 14, however, those skilled in the art will appreciate the outer surface of the base structure 14 can be the decorative component 15 such that it is integral to the component 14. Covering the decorative component or surface 15 is a protective film 50. The protective film 50 protects the decorative component 15 from scratches and scuffs and can be removed when the vehicle is sold. The wood veneer covering 15 is shown as a separate component from the base structure 14. The base structure 14 is formed in an arcuate section having a unique cross section. This cross section is provided with two 90 degree locking corner sections that are inclined as shown forming a locking apex 17 on each side of the base structure 14. As shown the leather component 12 prior to assembly would be pulled preferably taut to a predetermined tension or force F by a clamping means (not illustrated) on the inner diameter or edge and on the outer diameter or edge, these clamping means would hold the leather component 12 similar to a drum head in a relatively tight fashion.

The underlying locking structure 16, as it is shown, has two complimentary channels 18 on each side of a raised contoured center portion 19. The contoured center portion 19 can be flat or substantially rounded such that when assembled, the outer base structure 14 and the lower locking structure 16 can be affixed by the pins 13 or otherwise as will be discussed later in such a fashion that as the assembly is made the leather pliable component 12 is forced by the outer base structure 14 into the channels 18 provided in the lower locking structure 16 forming the two "v" shaped depression sections in the leather component 12 as shown for exemplary purposes. It is appreciated that the pliable component 12 when clamped prior to assembly is flat without the "v" shaped depressions as shown. This is extremely important to the extent that as the assembly is made the leather is stretched by the assembly and by having the ends clamped or otherwise retained it is believed that the occurrence of wrinkles, puckering or other defects can be virtually eliminated because of this subtle pre-tensioning that is created simply by the attachment of the two components 14, 16, as the components 14, 16 are drawn together the leather 12 is stretched, this has a great advantage.

Figure 2:
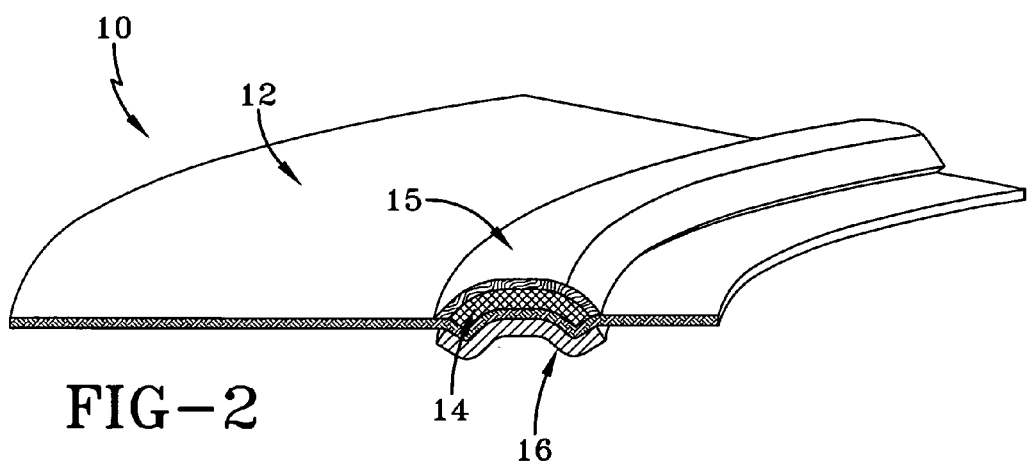
FIG. 2 is a top perspective view of the assembled subassembly taken from FIG. 1.
Figure 3:
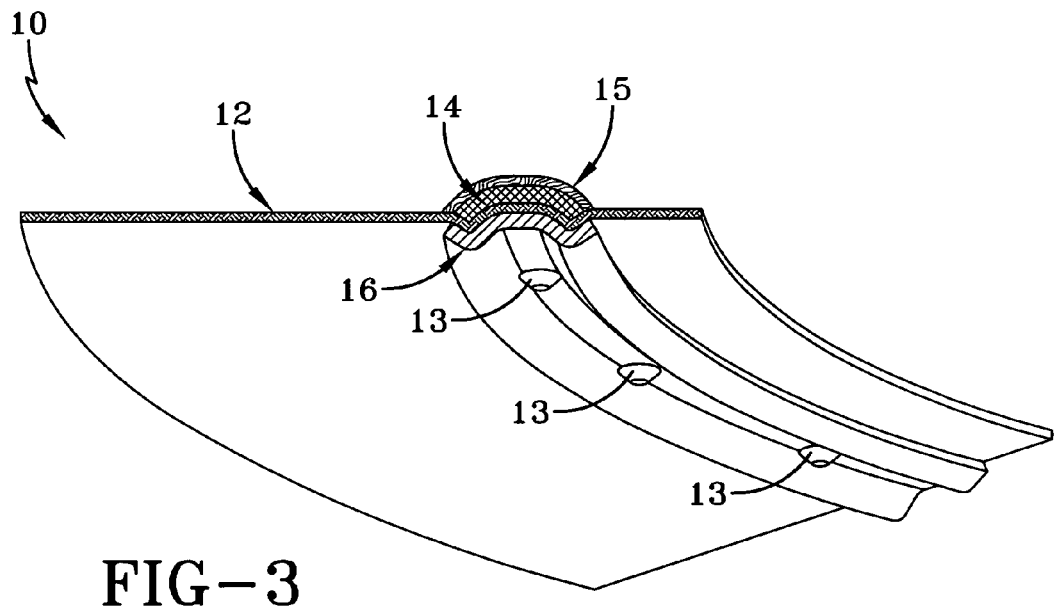
FIG. 3 is a bottom perspective view of the assembled subassembly taken from FIG. 1.
Figure 4:
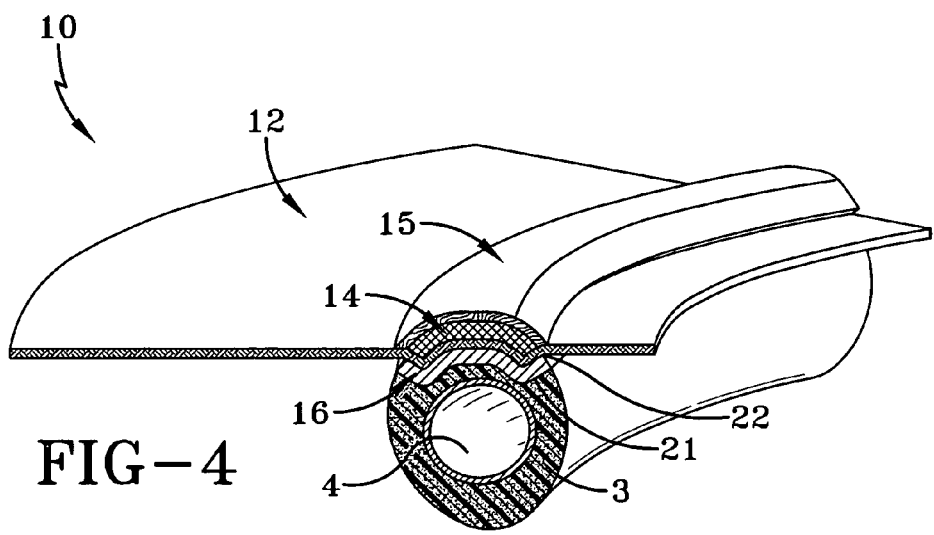
FIG. 4 is the assembled subassembly of FIG. 1 shown prior to being wrapped around a polyurethane or other wise soft exterior of a steering wheel rim.

As shown in FIG. 2, the outer base structure at the two apexes 17 form a pair of primary locking corners which, locks and pinches the leather component 12 into position and the leather 12 is therefore securely retained in a non-slip fashion in the channels 18. As shown the outer veneer covering 15 mounted onto the base structure 14 is in tight alignment with the leather, this is true because of the contour of the underlying locking structure 16. The locking structure 16 having the channels 18 inward of the flanges 21 extending upwardly creating edges 22, 23 such that on assembly as shown in FIG. 4 the leather 12 can be wrapped around the secondary locking corner at edge 22 creating a very sharp and physically resistive component such that the leather when drawn tight can be stitched relying on the base structure 14 in combination with the locking structure 16 to provide a firm and rigid resistance upon assembly. This is particularly important when stitching the leather 12 onto the rim 4 of the steering wheel 2.

Figure 5:
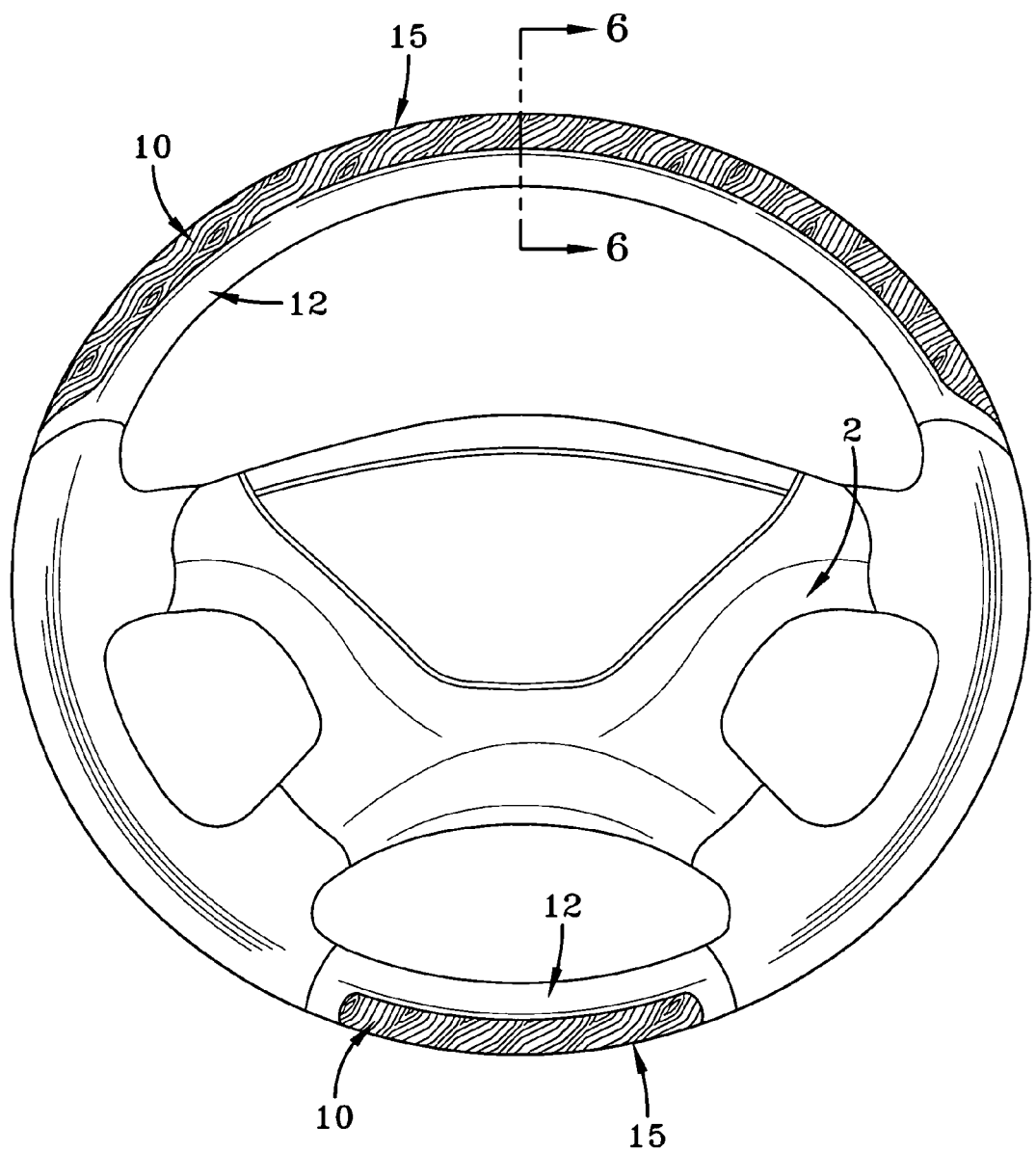
FIG. 5 is a plan view of a steering wheel employing two of the subassemblies as shown from FIG. 1.

As shown in FIG. 5, the assembly has a wood grain appearance. As shown two of the leather subassemblies 10 with leather components 12 and decorative coverings 15 are attached to this steering wheel 2 to make a final assembly.

Figure 6:
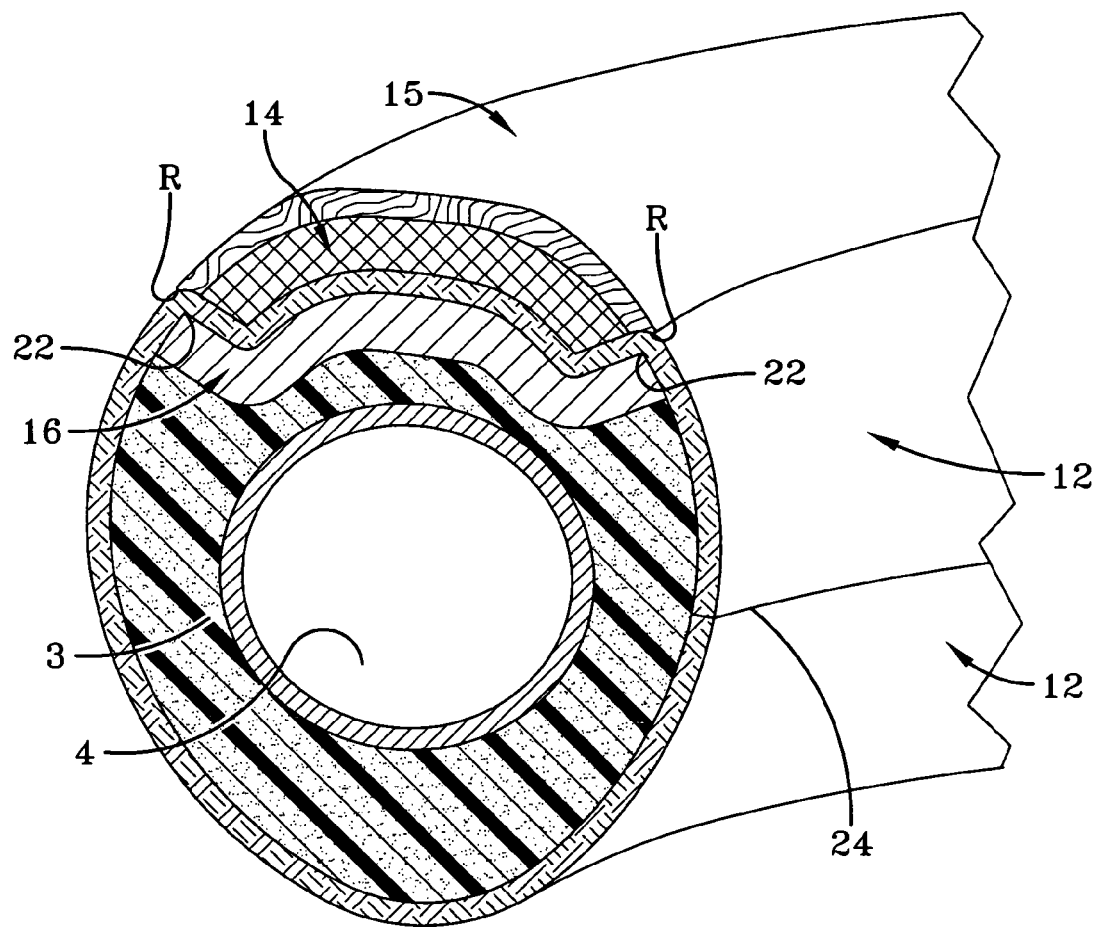
FIG. 6 is a partial cross-sectional view of the steering wheel rim having the subassembly affixed thereto.

With reference to the enlarged cross-sectional view in FIG. 6 greater detail can be shown of the final assembly. The stitch line 24 is illustrated on the interior of the steering wheel rim 4. The locking base structure 16 is shown wherein the leather 12 is securely and wrapped over the edge 22 in such a fashion that the radius of curvature R of the leather 12 is kept at a minimum. This ensures that there is virtually no crevice available. Furthermore, as shown the decorative cover or layer 15 or base 14 can be slightly contoured along the edges in such a fashion that the small amount of radius of curvature R can be accommodated for by the decorative cover 15 or the base structure 14. This is achieved by providing a slight concave radius of curvature R to complement the convex radius of curvature R that is formed in the leather component 12 upon stitching. By doing this there is virtually no crevice for dirt or debris to collect in as is common in the prior art due to the deformation of the polyurethane or soft covering 3 of the rim 4.

With reference to FIGS. 7-12, a second embodiment 40 according to the present invention is shown. In this embodiment 40 the intermediate article of manufacture is provided not only with a leather pliable component 12 and one or more decorative components 15 or 14, but also an outer boundary edge ring 30 of chrome or otherwise highly shiny polished metallic or otherwise aesthetically appealing boundary edge 30 to provide a distinctive and complimentary look between the leather 12 and the decorative component 15. This boundary edge 30 highlights the distinctive look and provides additional aesthetic appeal to the finished product.

Figure 7:
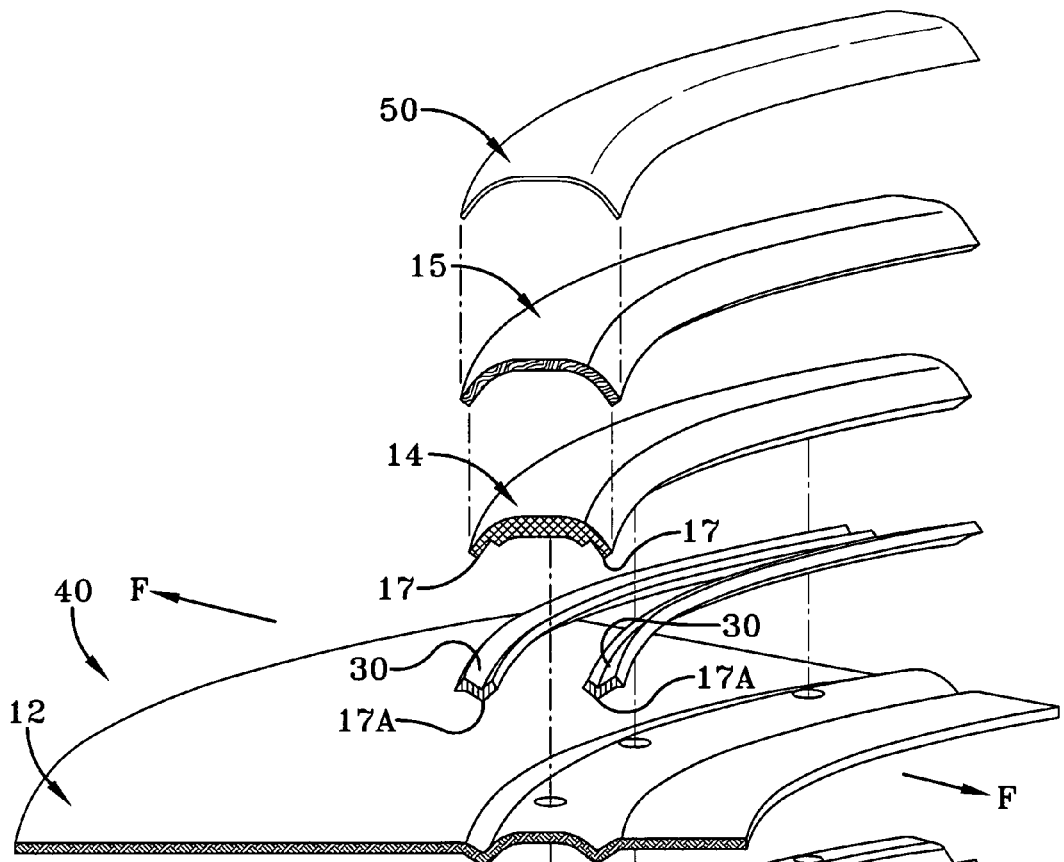
FIG. 7 is an exploded perspective view of a second embodiment of the invention.

With reference to FIG. 7, the second embodiment 40 is shown in exploded view. Again the leather pliable component 12 preferably is held tight on the interior edges and the exterior edges such that when the assembly 40 is made the underlying structure 16 with "v" channels 18 on each side is allowed to receive the leather 12 as the outer base structure 14 and the underlying boundary edge components 30 are forced into contact with the leather 12. As shown the base structure 14 has the outer veneer covering 15 shown as a separate component, but as already stated the base structure 14 could be printed with the decorative wood grain texture or any other decorative appearance such as highly polished lacquer or other printed or painted on surface. As the outer base structure 14 is brought into contact with the edge components 30, the entire assembly 40 is drawn tight such that the edge components 30 are retained in the "v" apex 17 as shown.

Figure 8:
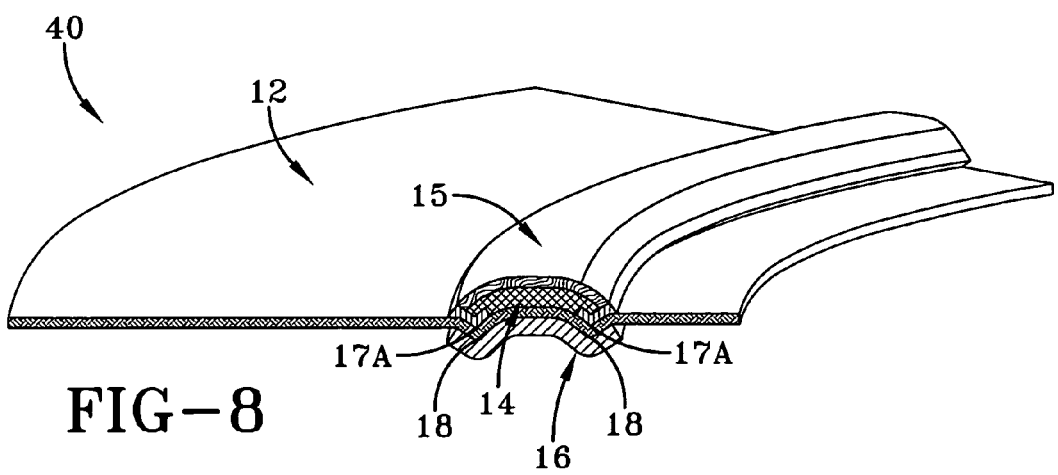
FIG. 8 is a top perspective view of the assembled subassembly according to the second embodiment.

In the embodiment of FIG. 8, the "v" apex 17A is formed by the two outer boundary edge components 30, these outer edge boundary components 30 are retained onto the base structure 14 as illustrated and also align with the outer veneer covering 15 to make an outer subassembly of the decorative component 14, 15 and 30. Again the apex 17A when brought into contact with the leather 12 presses the leather 12 and pinches it into the "v" channels 18 such that the leather is stretched upon assembly as the components are assembled the leather 12 is taut and therefore no wrinkling or puckering can occur as was the case in the first embodiment of the invention.

Figure 9:
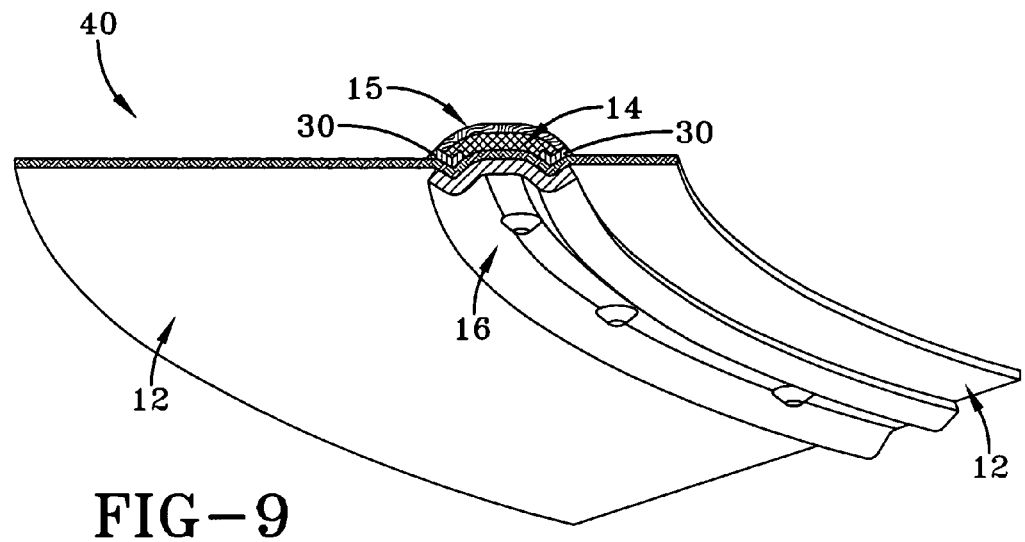
FIG. 9 is a bottom perspective view of the assembled subassembly showing the interior surfaces of the subassembly.
Figure 10:
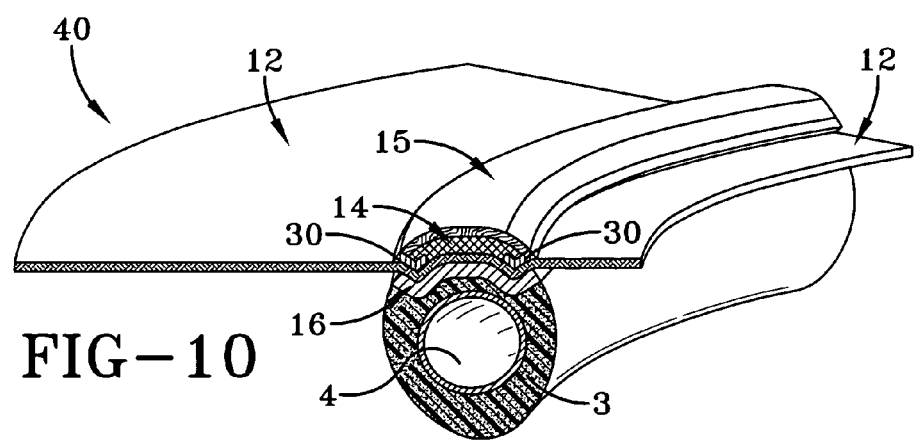
FIG. 10 is a view of the second view of the second embodiment subassembly being wrapped around a portion of a steering wheel rim, the steering wheel rim having a soft outer coating.

FIG. 9 shows an under view of the subassembly 40. FIG. 10 shows the subassembly 40 mounted onto the polyurethane or otherwise soft exterior 3 of a portion of the rim 4. Preferably the rim 4 or soft exterior 3 is contoured to accept the base structure 14 such that no excessive deformation need occur on the rim 4. Furthermore this provides a means of enabling the assembler to simply mount the subassembly 10 or 40 onto the rim 4 in the proper location. The leather 12 is cut to a precise pattern, knowing the diameter of the rim 4 to which it will be mounted it is possible then that the subassembly 10 or 40 can simply be folded or wrapped around the outer exterior of the rim 4 in such a fashion that the seam edges meet at the stitch line 24.

Figure 11:
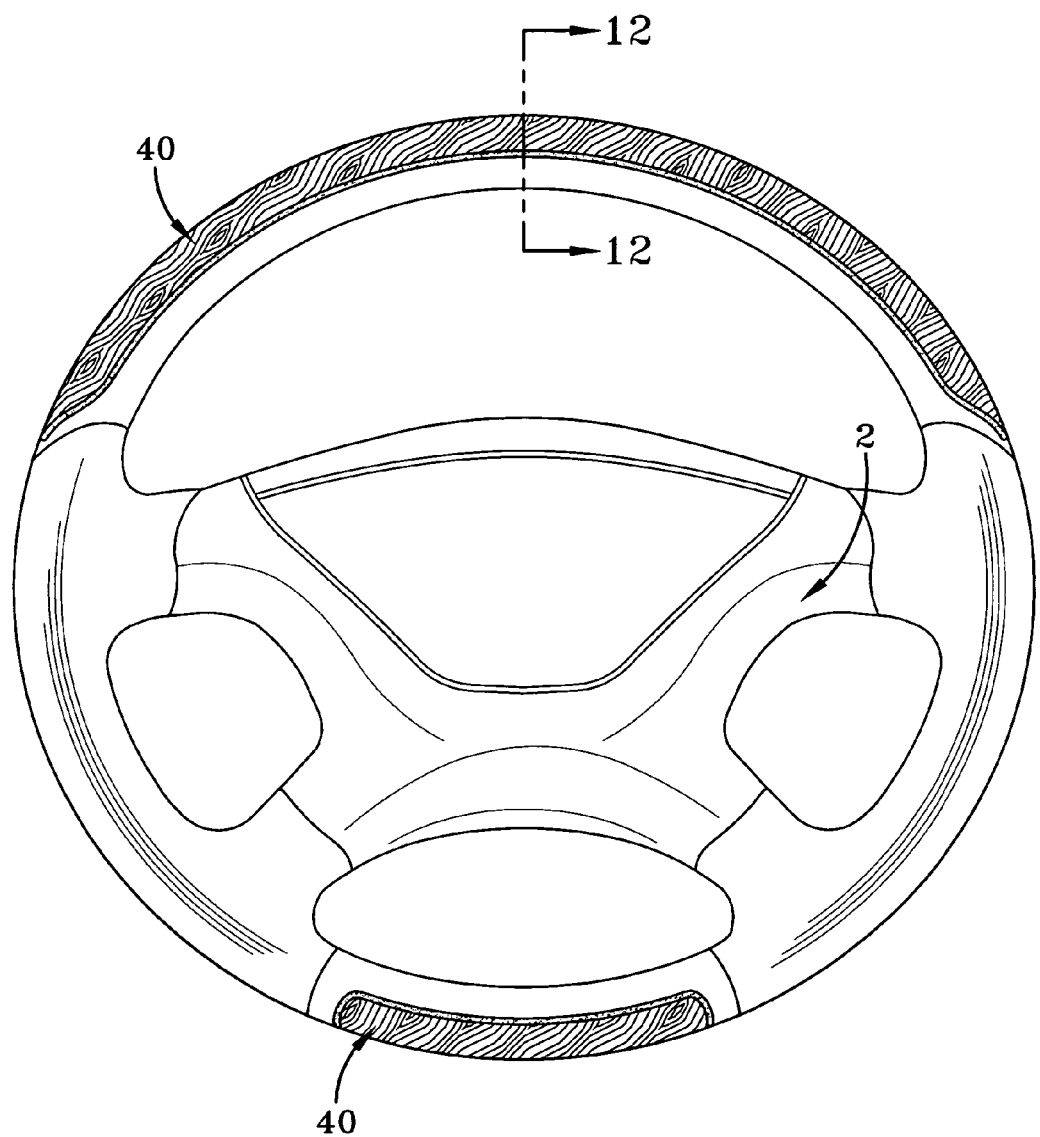
FIG. 11 is a final assembly of two of the subassemblies according to the second embodiment being shown in plan view mounted onto a steering wheel.

FIG. 11 shows two of the subassemblies 40 attached to a steering wheel 2 similar to the way subassemblies 10 were shown attached in FIG. 5. The second embodiment 40 is shown wherein the upper portion of the steering wheel subassembly 40 covers approximately 120 to 180 degrees and the lower subassembly 40 covers a quadrant of 60 to 90 degrees. As shown the outer first subassembly is provided to substantially match the opening in the steering wheel, as is the lower subassembly 40.

Figure 12:
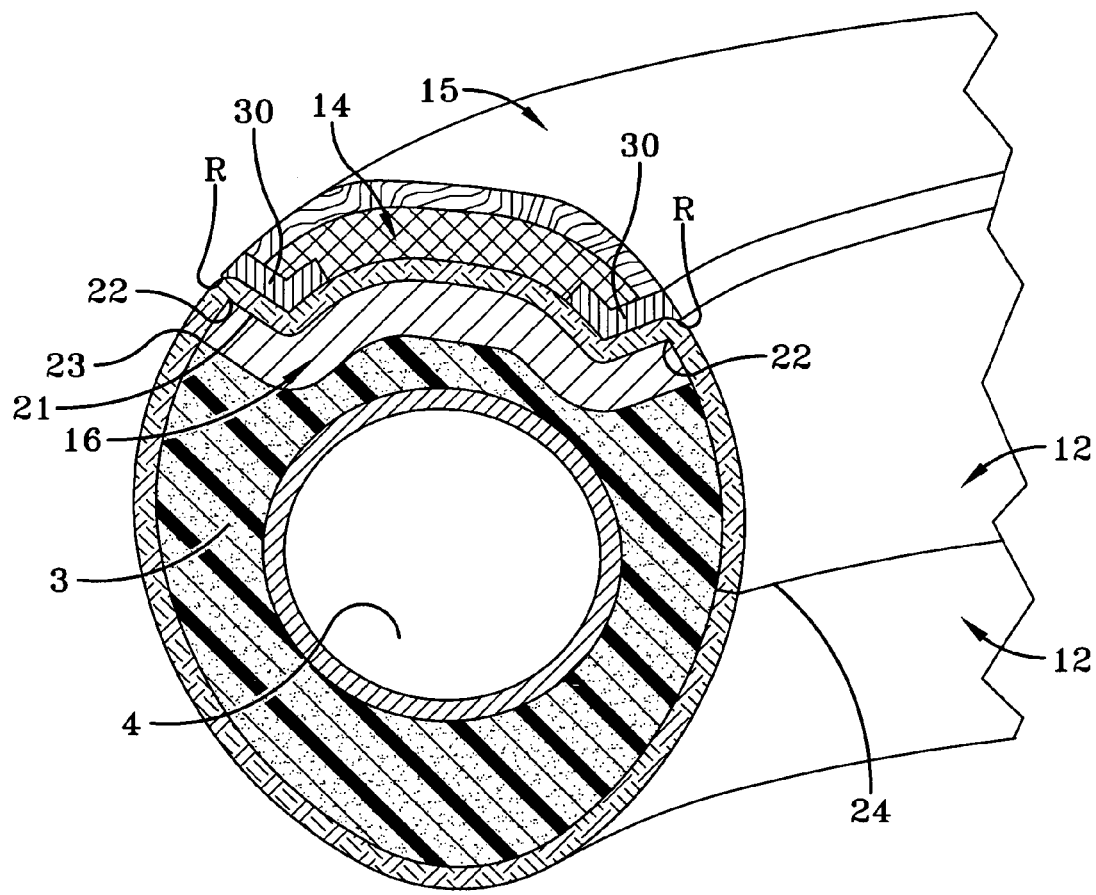
FIG. 12 is a cross-sectional view taken along lines 12-12 of FIG. 11 showing a cross-sectional view of the second embodiment of the invention.

With reference to FIG. 12, it is shown that the stitch line 24 is thus provided again on the interior of the rim 4. The stitch line 24 alternatively can be provided on the exterior if so desired for aesthetic reasons; however, normally the stitch line 24 is preferably placed on the interior of the rim. Again as shown in FIG. 12, the outer edge component 30 can be slightly contoured or have a slight curvature R at the exterior portion that complimentarily matches the radius of the curvature R of the leather 12. The crevice as shown is filled by the edge component 30 that provides a shiny boundary edge for the decorative component 15 and the pliable leather, simulated leather or leather equivalent component 12. As shown there's a slight contour on the rim component, this is easily accomplished when the boundary edge component 30 is made of plastic and is plated or otherwise highly polished to provide a distinctive look. However, should actual metal edge component 30 be bent and formed this covering of the crevice will not be possible in an easy fashion and therefore it is likely that there will be a small crevice occurring should a metal edge 30 be provided. In such a case it is important to note that the leather contour radius is less than 2 mm radius of curvature when bent over the underlying edge 22 of the locking structure 16 which is extremely important in that in the prior art it is virtually impossible to achieve such a low radius of curvature when folded or pulled over the soft urethane foam 3. This is a particularly distinctive advantage of the present invention when compared to the prior art.

As noted all of the components holding the leather pliable component 12 as a subassembly 10, 40 can be made of plastic therefore while a very distinctive look can be achieved, it can be achieved at a very minimal cost.

With reference to FIGS. 13-24, a brief discussion of alternative ways of mounting and securing the subassemblies 10, 40 to the rim component are illustrated.

Figure 13:
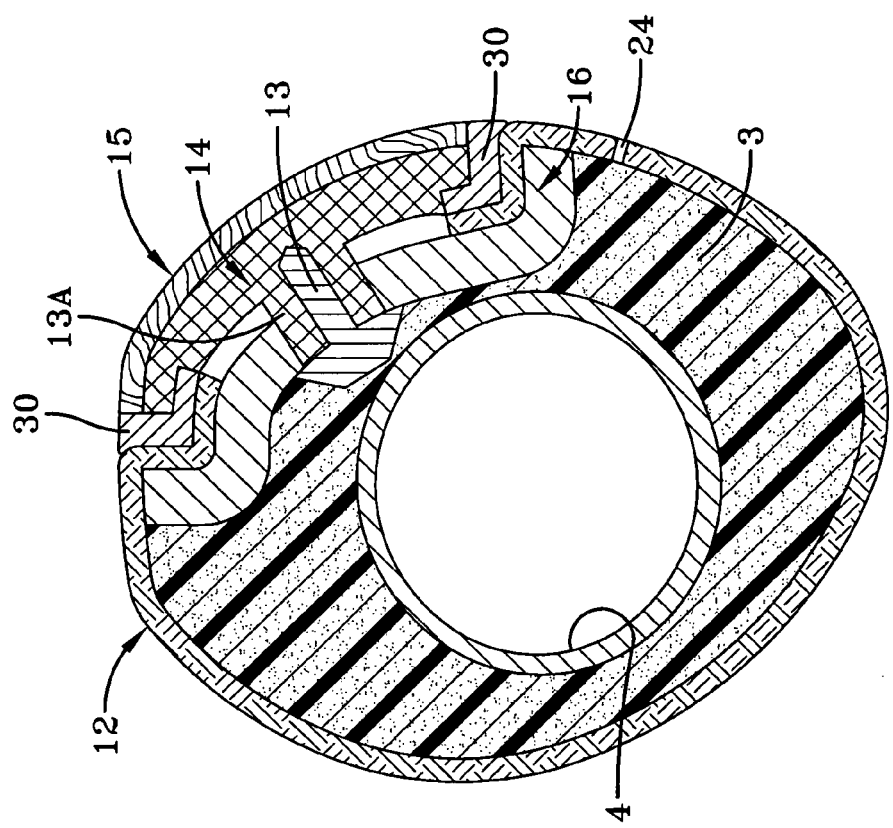

With reference to FIG. 13, it is shown that the outer base structure 14 can have a cylindrical component 13A that extends into the underlying locking structure 16 in such a fashion that the two can then be pinned together using the pin 13 as illustrated in FIG. 13. In this assembly the leather 12 is cut providing an opening such that the cylindrical component 13A can extend there through to make the secure attachment of the two components 14, 15 thereby sandwiching the leather 12 between the outer component 14 and the locking structure 16 underlying the leather component 12.

Figure 14:
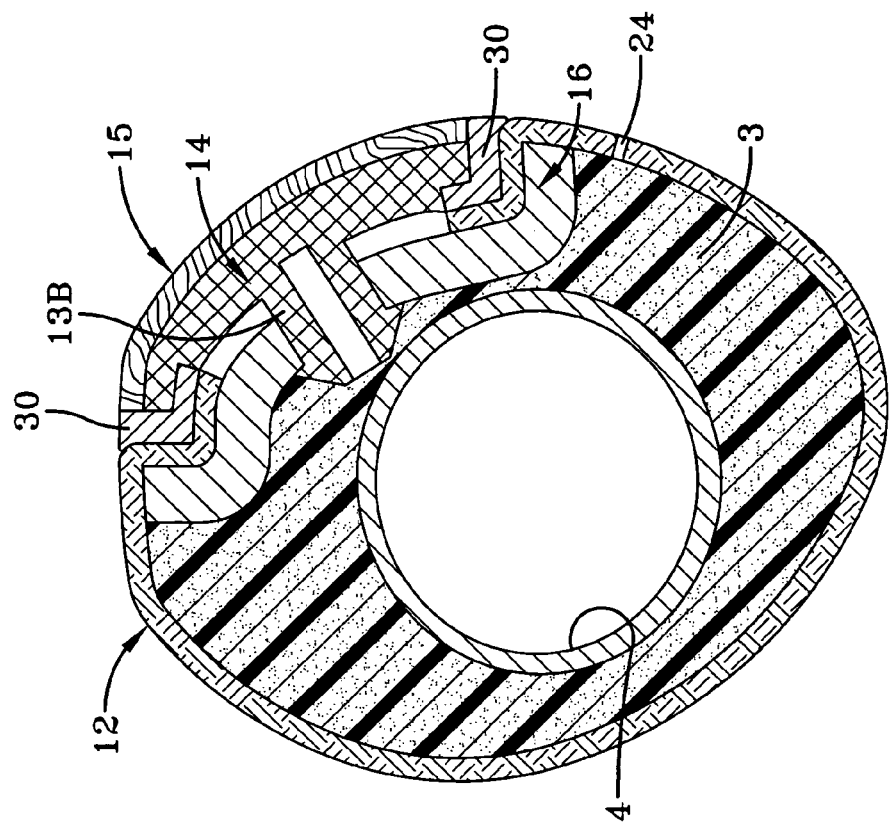

With reference to FIG. 14 it is further possible that the cylindrical appendage 13A can have a self locking head 13B such that upon assembly they are simply snapped together in such a fashion that will retain a sufficient amount of pressure to crimp the leather component 12 between the outer base structure 14 and the locking structure 16 as illustrated.

Figure 15:
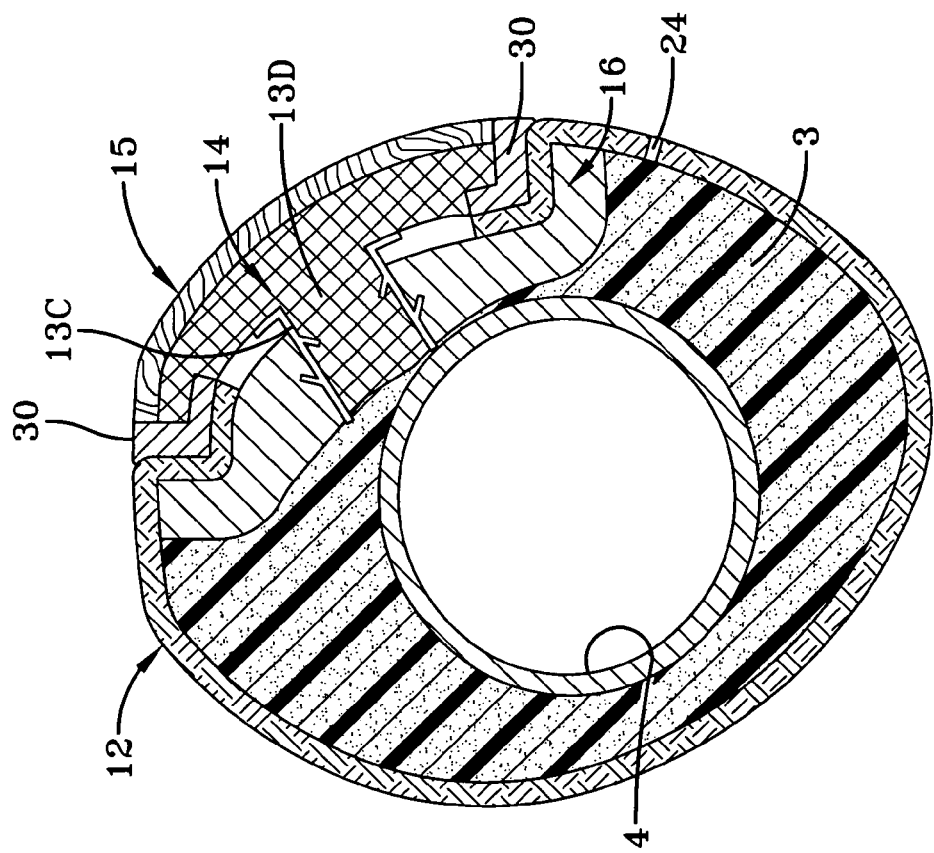

With reference to FIG. 15, the base structure 14 can use a mechanical locking means or feature 13C as illustrated in such a fashion that the cylindrical portion 13D of the outer base structure 14 can have the component 13C adhered to it as a locking means on the outer cylindrical portion 13D such that when the two assemblies 14, 15 are forced together the locking means 13C engages into the underlying locking structure 16 and the appendages on 13C create locking interference such the components cannot be easily separated. Again sufficient pressure would be required to ensure that the leather component 12 cannot pull out from the locking being created by the decorative edge components 30 as illustrated in FIG. 15.

Figure 16:
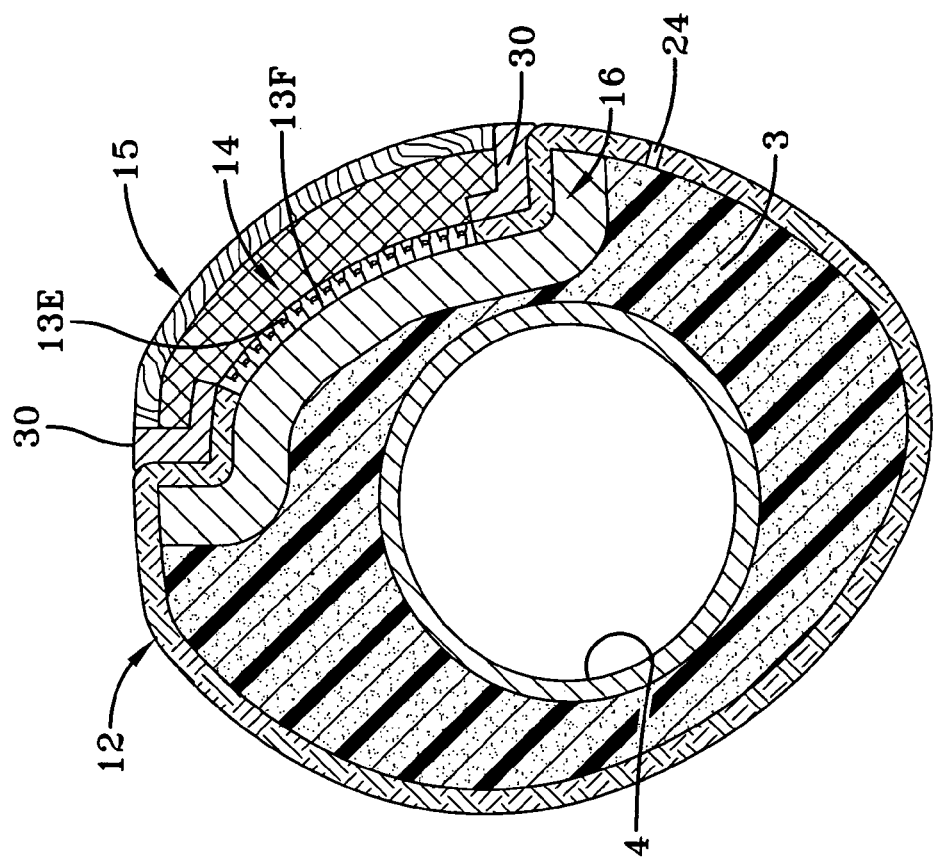

With reference to FIG. 16, a Velcro attachment can be provided such that the two components 14 and 16 can be physically adhered by mechanical means using two Velcro layers 13E and 13F, one on the locking structure 16 and a complimentary one on the outer base structure 14 such that when the two are pressed together the assembly is completed. This assembly may further include the use of glue or other adhesives to ensure that upon assembly they do not release or otherwise loosen during normal use.

With reference to FIGS. 13-16, it should be noted that the decorative component 15 is positioned on the upper interior portion of the rim 4. Assuming that the steering wheel center of axis is on the right hand of each of the figures as shown the rim decorative component is on an upper portion. If one looks at each cross-sectional view where 12 o'clock is at the upper portion and 6 o'clock at the lower portion, 3 o'clock on the right portion and 9 o'clock on the left hand portion, then the decorative portion is positioned between 12 and 3 o'clock in each of these figures.

Figure 17:
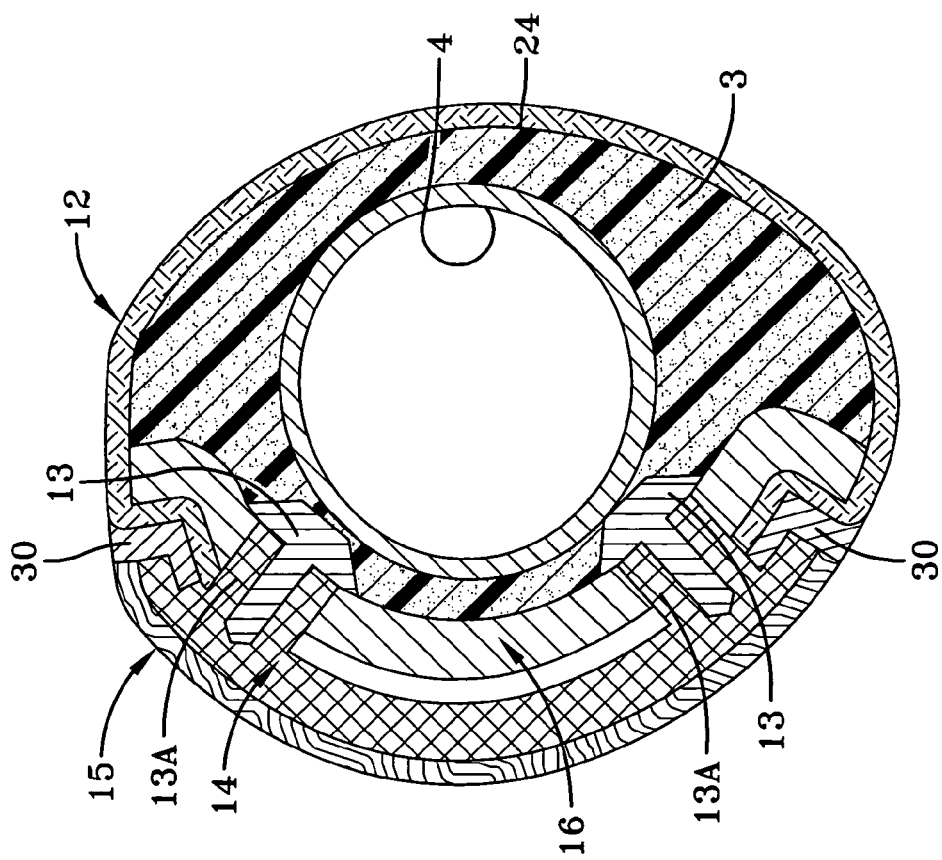
Figure 22:
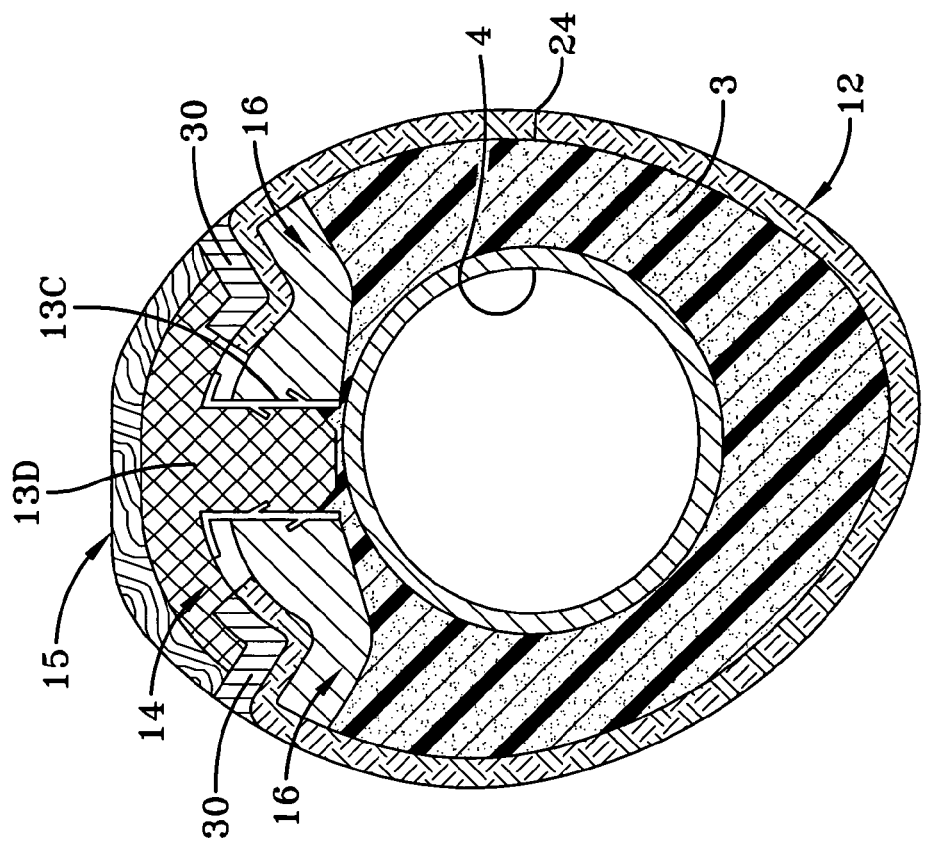

With reference to FIG. 17, the outer base structure may include two or more cylindrical pin sections 13A offset from the center and closer to the locking means created by the edge 30 in such a fashion the pins 13 will be pressed into the outer base structure 14 and help retain the locking structure 16 in firm contact with the outer base structure 14.

Figure 18:
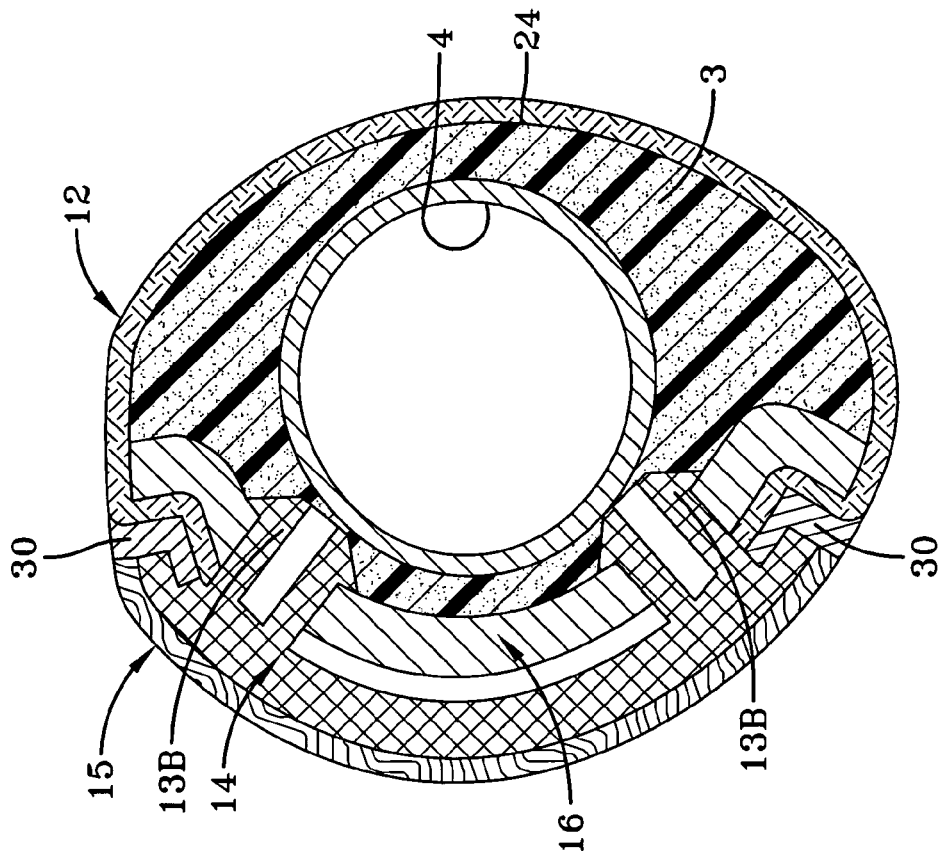

With regard to FIG. 18, the outer base structure may have the locking head arrangement 13B on each side as shown, such that the two components 14 and 15 can be stacked together thereby forming the subassembly 40 wherein the base structure 14 is pressed into the locking structure 16 to make the subassembly 40.

With reference to FIG. 19, the base component 14 and the locking structure 16 as shown attached or affixed using Velcro layers 13E and 13F as previously mentioned in an earlier embodiment. Velcro can be used alone or in combination with adhesives or glues in such a fashion that a secure attachment can be made. It is important that if adhesives or glues are utilized that the subassembly is made in such a fashion that the component is provided with a mandrel, press or otherwise a gluing fixture so that adequate pressure can be applied on assembly so that the components do not loosen during normal use. With particular reference to FIG. 19, it is observed that no underlying urethane coating 3 is provided at the 9 o'clock position of the subassembly relative to the rim. Accordingly the attachment is rather rigid at the 9 o'clock position making a rather firm feeling assembly whereas at the edges there is some urethane 3 providing a cushioning effect as the leather 12 initiates around the periphery of the rim 4, therefore you would get a combination of the hard outer feel with a soft inner feel relative to the rim 4. This is a feature that may be desirable in some applications.

With reference to FIGS. 17-19, the decorative component 15 is positioned between 6 o'clock and 12 o'clock and is approximately centered at the 9 o'clock position. In these embodiments, the decorative portions cover a large portion of the outer periphery of the rim 4 as illustrated this means that they are outward of the center of axis of the rim 4 and the leather component 12 is stitched on the interior portion towards the center of axis of the rim 4.

Figure 21:
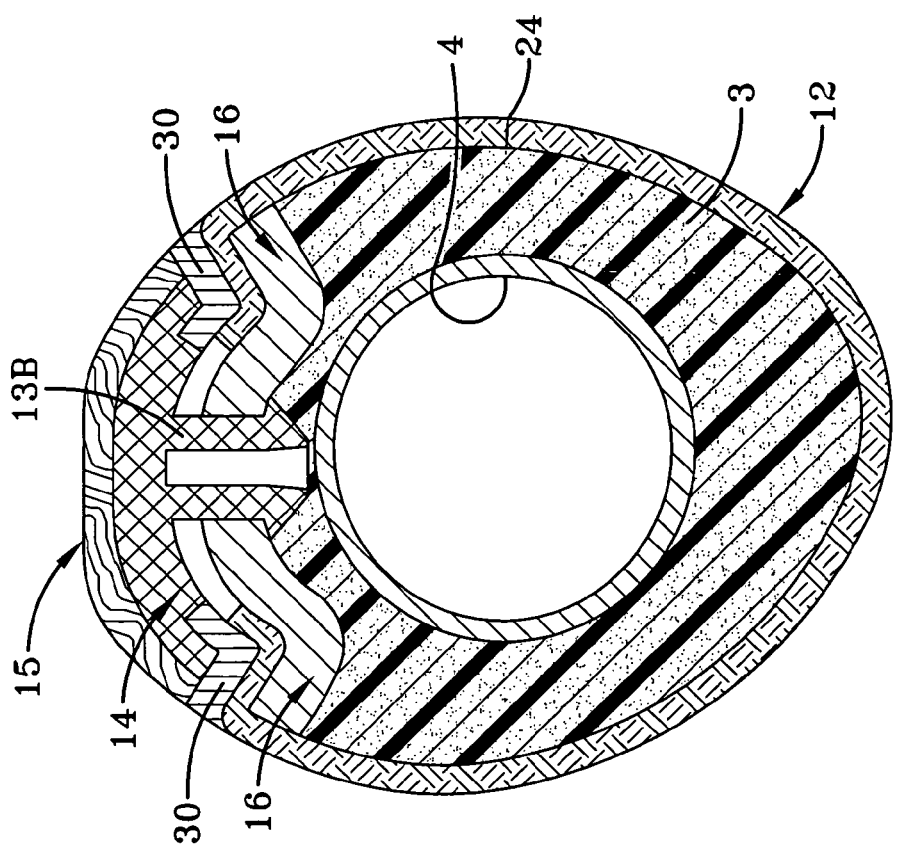
Figure 23:
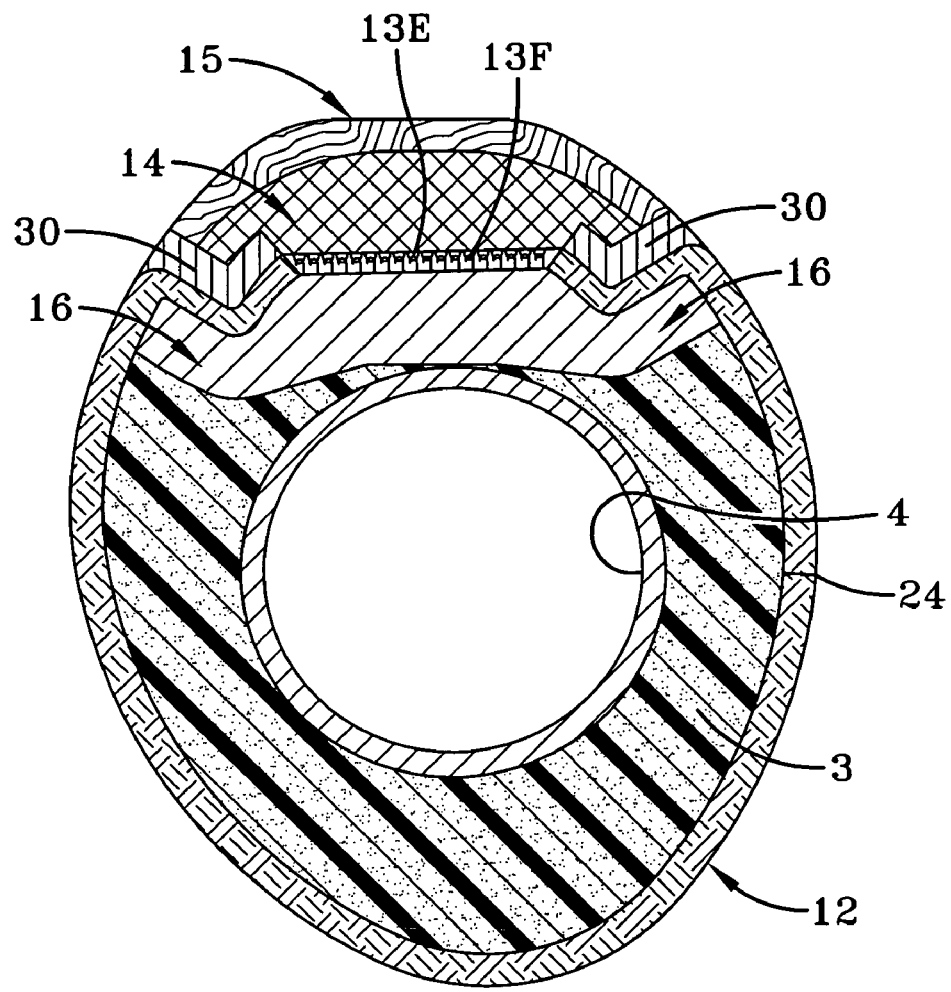

With reference to FIGS. 20-23, the decorative component 15 is shown at the 12 o'clock position of the rim 4. In this position the decorative component 15 is on top of the rim 4, in this fashion the subassembly 10 or 40 can be laid directly on top of the rim 4 and can cover a small arcuate portion of the outer periphery of the rim 4 or in fact be provided as an annular ring 360 degrees around the rim 4. Again as shown in this fashion the locking structure 16 can be connected to the base structure 14 by means of a screw or pin 13 as illustrated in FIG. 20 or by glue or adhesive or Velcro 13E, 13F as shown in FIG. 23 or by a locking head 13B as shown in FIG. 21 or by a locking means 13C that is provided on the exterior of a cylindrical protruding component 13D on the base structure 14 that is received in an opening in the locking structure 16. In each of these cases the leather component 12 is cut or pierced to provide an opening such that the attaching means can be passed through the leather component 12 to make the assembly.

In every assembly as illustrated the locking structure 16 provides a trough or channel 18 with a "v" shape on each side such that either decorative boundary edge component 30 or the base structure 14 itself can provide a sharp "v" shaped apex 17 or 17A that can push the leather 12 into the trough or channel 18 forming a subassembly and thereby pre-tensioning the leather component 12 thus on assembly there will be no wrinkling or puckering as is common when these components are assembled directly onto the steering wheel 2 absent this innovative type of subassembly 10 or 40.

Figure 24:
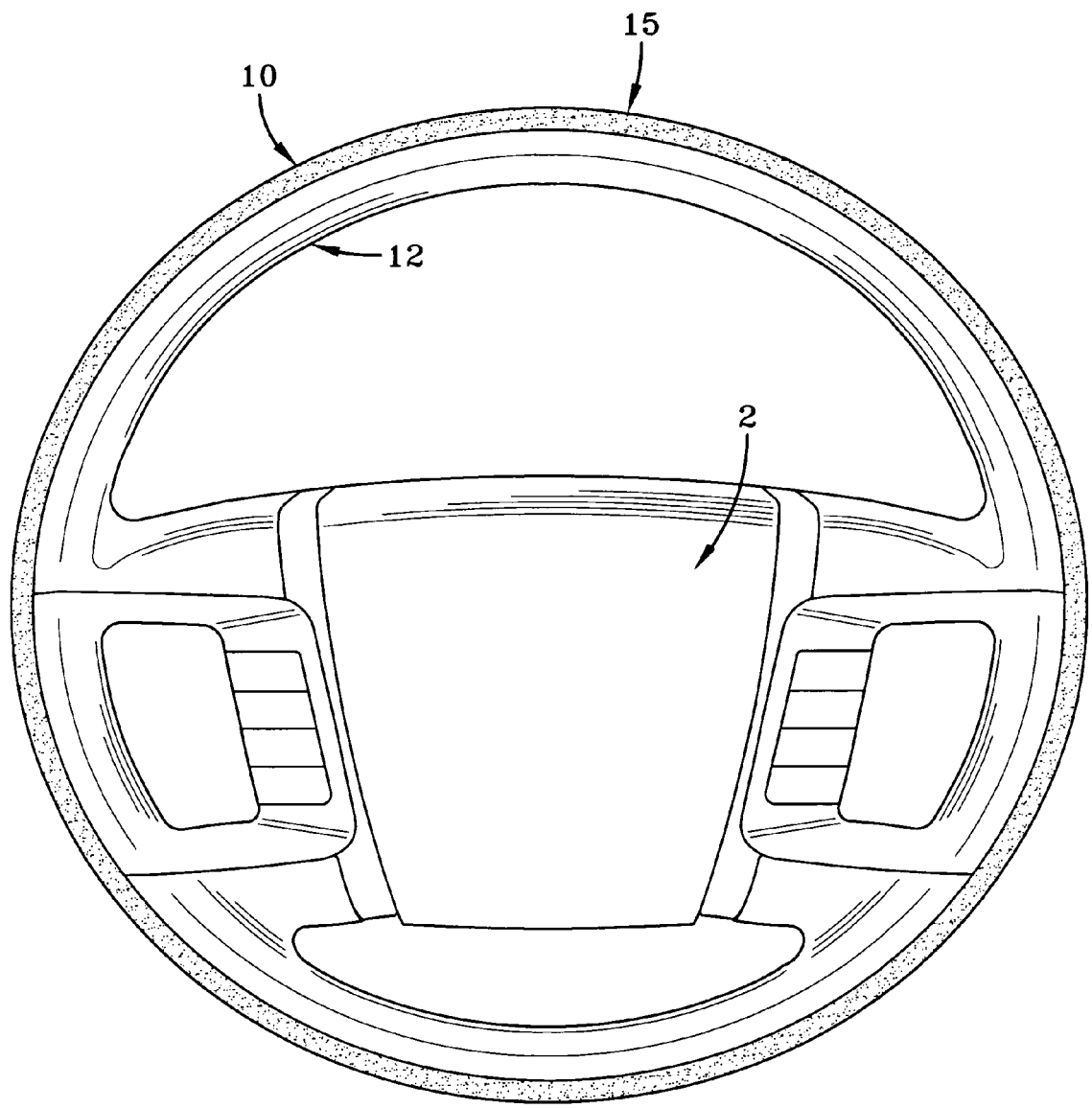
FIG. 24 is a plan view of a steering wheel employing the subassembly of the invention, in this plan view this subassembly has a 360 degree decorative element overlay on the rim.

With reference to FIG. 24, the embodiments of FIGS. 20-23 provide a way of making a 360 degree attachment as illustrated. As shown in FIG. 24 this subassembly 10 has no outer boundary edge 30, but alternatively could be provided with one if so desired. This distinctive feature is quite hard to achieve in normal steering wheel assemblies, however, due to the unique nature of the method in which the subassembly 10 or 40 is produced it is quite easy to produce this rim feature compared to the prior art.

Figure 25:
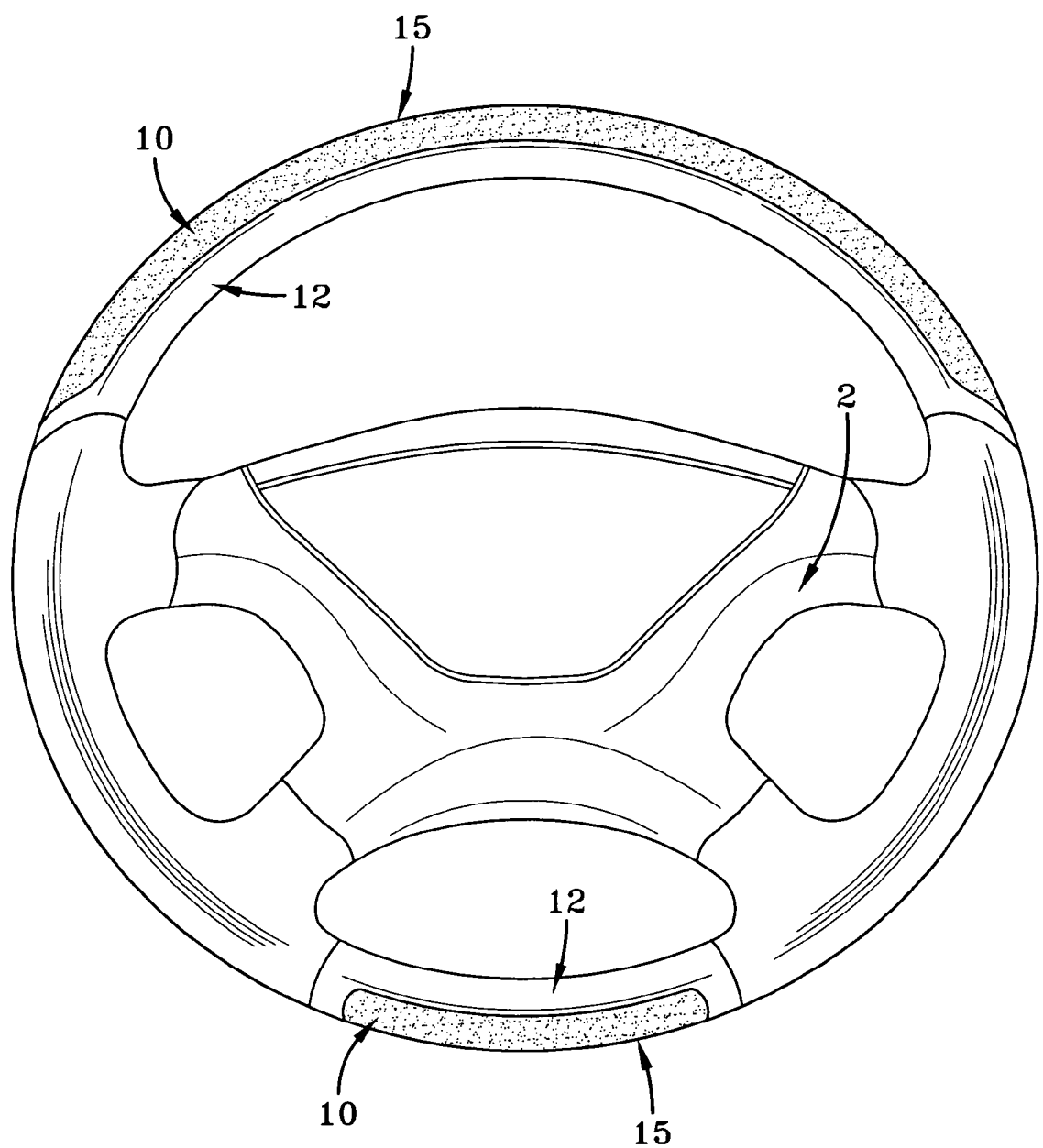
FIG. 25 is a plan view of a steering wheel showing two subassemblies, one at the top side of the steering wheel and one at the bottom side of the steering wheel, the decorative components being of substantially different size showing a different variation of employing the present invention.

With reference to FIG. 25, the subassemblies 10 are shown on the outer periphery and these components are best described in FIGS. 17-19 as previously discussed. These designs provide a distinctive appearance where the arcuate section can extend upwards to 180 degrees, however, not much beyond 180 degrees unless the decorative component 15 is provided in two pieces with an abutting seam.

Figure 26:
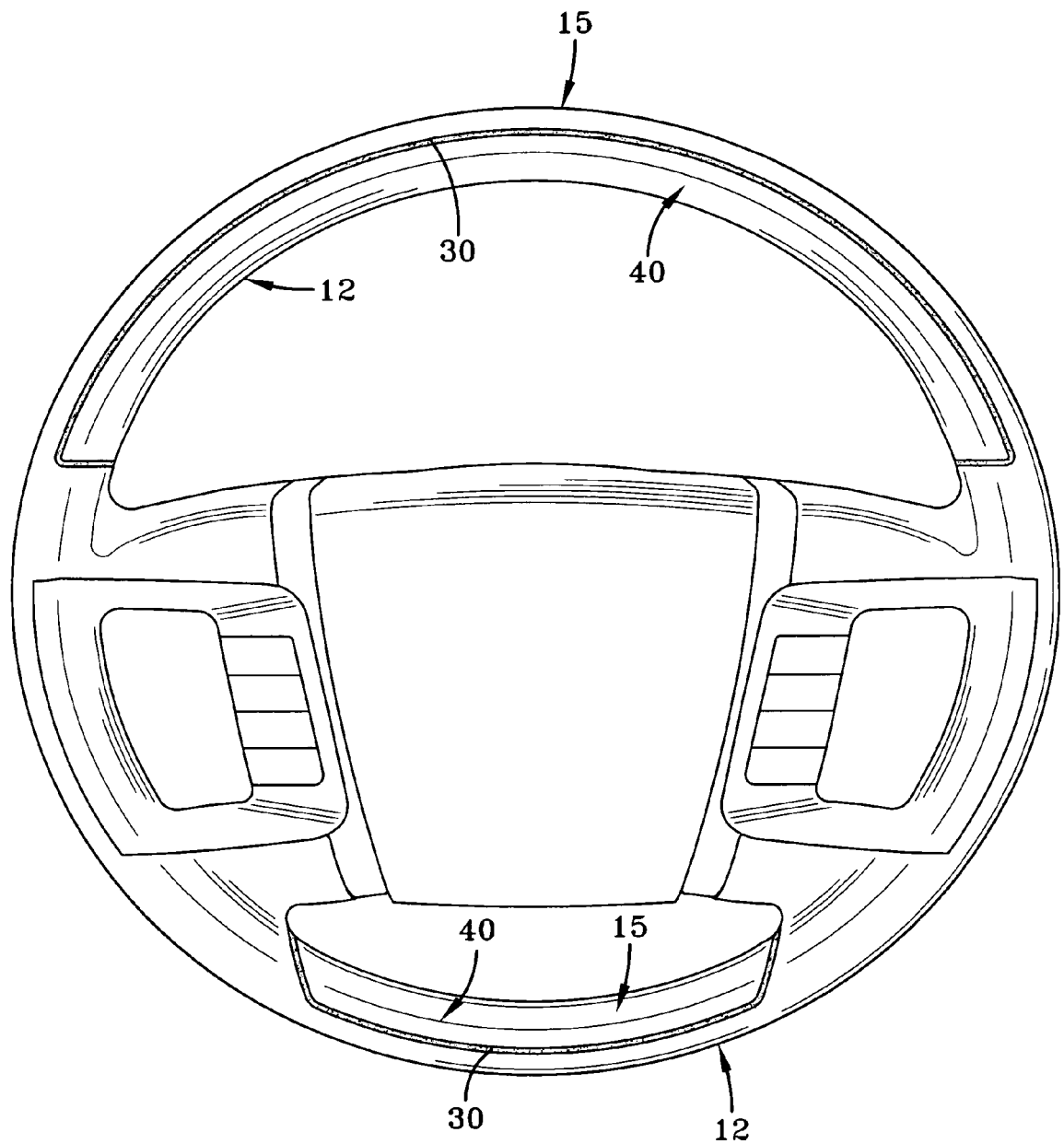
FIG. 26 is a plan view of two of the second embodiment of the invention applied to a steering wheel.

With reference to FIG. 26, the decorative component 15 is shown mounted on the interior of the rim 4 and as shown in FIG. 26 the boundary edge 30 is shown. In this fashion it's similar to those shown in FIGS. 13-16. Alternatively, however, they can cover a larger portion upwards to 180 degrees at the cross section of the rim if so desired.

Figure 27:
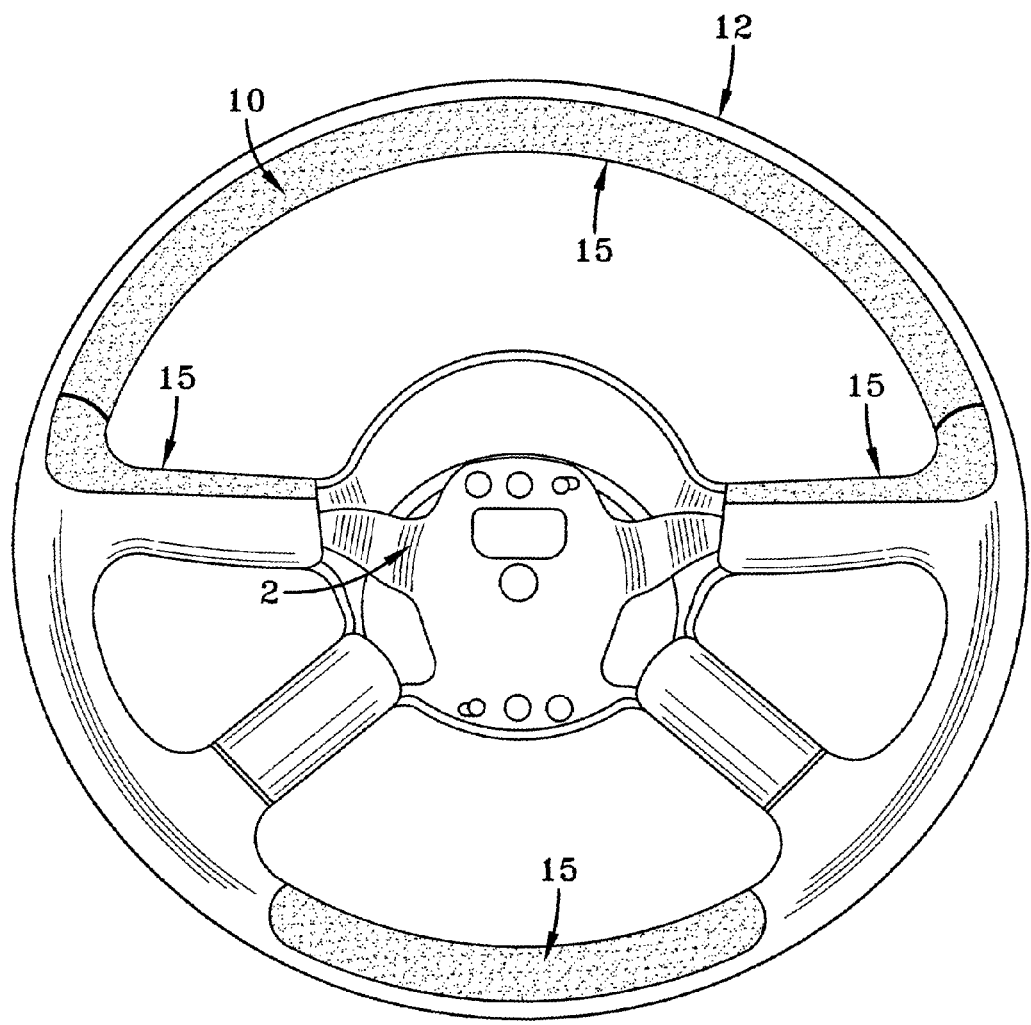
FIG. 27 shows a plan view of the subassembly according to a first embodiment of the invention, the first embodiment extending not only on the rim, but also on the spokes of the steering wheel assembly.

With reference to FIG. 27, the subassembly 40 is shown where the decorative components 15 are positioned at the top portion on the interior of the rim 4 and the bottom portion of the rim and also extending on the spokes 5 of the rim 4. As shown this embodiment has the decorative coverings 15 with a butt or weld line on these components so the assembly can be completed and provide a decorative or wood grained type finish or other type of finish if so desired. As shown the decorative component 15 is simply illustrated as a texture or color different than that of the outer pliable component or leather simulated component 12.

In each of the embodiments illustrated on a steering wheel assembly 2, the pliable leather component 12 is adhered to one or more decorative components or layers 15 on or part of the base structure 14 and one or more securing components or locking structures 16 in such a fashion to form a subassembly. The leather component 12 has an outer edge and an interior edge that when wrapped on the steering wheel upon final assembly covers at least a portion of the article enveloped by the subassembly 10 or 40. It is important to understand that the wrapping of vehicle articles can be accomplished on a number of vehicle components such as the steering wheel, vehicle seats, gear shift knobs, center consoles, window visors, arm rests, interior door coverings or any other passenger compartment article in an automobile, aircraft, watercraft or train type vehicle.

The intermediate article of manufacture when used as a subassembly for wrapping on the outer portion of a steering wheel 2 may have the subassembly layer shaped as an arcuate section, a semi-annular section or a full annular section. The outer base structure 14 can be interposed between the outer decorative component 15 and the leather, simulated leather or leather equivalent pliable component 12, but on the exterior side of said pliable component 12 in such a fashion that the decorative component 15 is a separate component from the outer base structure 14 as previously mentioned. Alternatively, the outer base structure 14 may include a paint layer 15 or other decorative layer 15 that is printed on or otherwise adhered to the exterior of the outer base structure 14.

As in each embodiment the arcuate section, semi annular section or annular locking structure 16 is complimentary to the outer base structure 14, in other words whatever the length of the arcuate outer structure is the underlying locking structure preferably will complimentarily match the outer base structure. In the preferred embodiment this outer locking structure 16 is placed adjacent to the leather, simulated leather or leather equivalent pliable component 12 on an interior side of this pliable leather component 12. The locking structure 16 thus is generally aligned with the base structure 14 and connected together by one or more securing means 13, 13A-13F as shown in the illustrated embodiments. The one or more securing means of the subassembly 10, 40 as previously mentioned can be an adhesive attachment to both sides of said pliable component 12 passing through openings in said pliable components 12 to ensure that the base structure 14 and the locking structure 16 are securely affixed to each other upon assembly. The one or more securing means can be a Velcro component 13E, 13F, if a Velcro component is used it may be preferable that additional adhesives or other components be used as a securing means. As shown one or more securing means can be used in combination, the one or more securing means can include, screws, pins or equivalent fastening or locking means as illustrated. Each passing through said pliable component 12 to secure the outer base structure 14 to said locking structure 16.

A significant added feature of using this intermediate article of manufacture as a subassembly is that a protective film or layer 50 can be applied to the exterior of at least said decorative component 15. This is important in that the outer peripheral surfaces of the decorative components can be scratched or otherwise marred prior to assembly, but providing this exterior protective film 50 as part of the subassembly, the assembler at final assembly when mounting the component to the steering wheel and stitching the leather or otherwise adhering the leather to the polyurethane coated rim 4 can do so in such a fashion that the concern over damaging the wood grain or simulated decorative component or layer 15 can be minimized. Accordingly this protective layer 50 covering the decorative component 15 can be left on the subassembly 10, 40 and even on the steering wheel 2 until the entire car is delivered and sold at such a time the protective layer 50 can be removed once the vehicle is being prepared for delivery to the final customer.

In each of the above mentioned figures the use of one or more decorative edge border components 30 can be employed. These edge border components 30 are optional and can be provided with the use of a decorative component or layer 15 or can be not used as in the subassembly 10. When used the decorative border edge component 30 is preferably a plastic component formed to fit along the edges of the outer base layer and to provide the pinching, locking corners or "v" apexes 17A such that they press the leather 12 into the channels 18 in the underlying locking structure 16.

All of the above subassemblies can be made using the following method of manufacture wherein a decorative leather, simulated leather or leather equivalent wrap or covering subassembly 10, 40 is formed. The methods include the step of forming a piece of leather or leather equivalent to a predetermined shape or pattern and attaching one or more decorative components to the predetermined piece of leather, simulated leather or leather equivalent component 12 and securing the formed leather, simulated leather or leather equivalent component 12 and one or more decorative components 15 to form a subassembly prior to being attached to the underlying structure to be covered. The method of manufacturing the subassembly 10, 40 may further comprise the step of attaching a removable protective layer 50 over the exterior surfaces of one or more decorative components 15. The method may further include the step of providing one or more openings in the cut piece of leather, simulated leather or leather component 12 such that the openings provide a space for securing the outer base layer 14 to the underlying locking structure 16. The method may further include the steps of securing the outer base structure 14 and the underlying locking structure 16 by the use of pins, screws, adhesives, Velcro or other securing means such that the outer base structure 14 compresses and pre-tensions the pliable leather, simulated leather or leather equivalent component 12 as it is secured between the outer base structure 14 and the underlying locking structure 16 in such a fashion that a slight pre-stretch occurs on the leather component 12. Preferably the leather component 12 is clamped at each interior and exterior edge such that the leather 12 is taut upon assembly, when assembled the leather 12 is then pressed into a pair of "v" troughs or channels 18 on the underlying locking structure 16 and pinched by a "v" apex 17, 17A on each edge of either the outer base layer 14 or the base structure 14 in combination with the boundary edge components 30 as shown. In such a fashion that this pinching of the leather pre-stretches and secures the leather component 12 in such a fashion that it is tightly secured. The method also includes the step upon assembly of folding or wrapping the leather subassembly around the outer rim 4 or spokes 5 of a steering wheel 2 such that the edge of the leather 12 has a radius of curvature R of less than 2 mm when wrapped around the underlying locking structure 16. This method insures that the crevice between the decorative component 15 and the leather 12 is kept to a minimum, preferably the radial contour or curvature R of the leather 12 is less than 2 mm more preferably 1.5 mm or less when so formed. The method further can include the step of sticking or otherwise bonding the subassembly to the rim or article to be covered. It is possible since the components can be formed of plastic that the base structure 14 or alternatively the boundary edge components 30 that are plated with chrome, gold or other shiny material can be provided with a concave curvature R that is complimentary to the convex radius of curvature R of the leather when wrapped around the edge 22 of the locking structure 16. In this fashion the crevice or opening is actually filled by this contouring on the exterior surface of either the base structure 14 or the boundary edge component 30.

A benefit of the wood insert or decorative element 15 being attached by means of its leather or leather simulated wrap or component 12 to form a subassembly 10, 40 is that long hooks are not required to hold the assembly to the steering wheel rim as is commonly used in the manufacture of steering wheels. Thus an armature occupying a greater percentage of the rim cross section can be accommodated if there are no hooks. Such rim sections offer advantages in so called fluid damper and other steering wheel applications that would otherwise be very difficult to be made with such aesthetically pleasing decorative elements.

Preferably the subassemblies 10 or 40 are provided in a kit suitable for covering one steering wheel. These kits enable the manufacture to reduce overall inventories of covered steering wheels to a minimum. Furthermore by providing these subassembly kits the manufacturer can provide a wide selection of color and style options that otherwise might be avoided. Therefore a common sized armature may have a wide variety of styles of coverings to choose from as a result of the use of the present invention.

While shown primarily as a component for attaching to a steering wheel, it's recognized that the other uses of this type of subassembly are beneficial in almost any interior vehicle component where a decorative feature is required in combination with a leather, or simulated leather, component. It is understood that there can be variations in methods of securing or attaching the underlying locking structure to the outer base structure and as such would still fall within the scope of the present invention.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An intermediate article of manufacture forming a subassembly comprising:
    a leather, simulated leather or leather equivalent pliable component;
    an outer base structure; and
    a locking structure, the outer base structure and the locking structure having surfaces that are complementary to one another with the leather, simulated leather or leather equivalent pliable component being sandwiched between complementary surfaces of the locking structure and the outer base structure, the locking structure connected to the outer base structure by one or more securing means, such that the leather, simulated leather or leather equivalent pliable component is clamped securely between the locking structure and the outer base structure with the simulated leather or leather equivalent component having one or more pairs of free edges spaced apart from the locking structure and the outer base structure.

2. The intermediate article of manufacture forming the subassembly of claim 1 wherein the one or more pairs of edges of the leather, simulated leather or leather equivalent pliable component being joined by stitching upon a final assembly to a portion of an underlying article enveloped by the subassembly.

3. The intermediate article of manufacture forming the subassembly of claim 2, wherein the subassembly is a wrapping for vehicle articles, the vehicle articles being selected form the group of: steering wheels, vehicle seats, gear shift knobs, center consoles, window visors, arm rest interior door coverings or any other passenger compartment article in an automotive, aircraft, watercraft or train type vehicle.

4. The intermediate article of manufacture forming the subassembly of claim 3 wherein the subassembly is a wrapping for steering wheels; the outer base structure and the locking structure having an arcuate semi-annular or annular shapes.

5. The intermediate article of manufacture forming the subassembly of claim 4 wherein the one or more securing means of the subassembly is an adhesive attached to mating surfaces on the outer base structure and the locking structure and passing through openings is said pliable component to bond said outer base structure to said locking structure.

6. The intermediate article of manufacture forming the subassembly of claim 4 wherein the one or more securing means is a Velcro attachment comprising one Velcro layer adhered to the base layer and one mating Velcro layer adhered to said locking structure to two Velcro layers passing through an opening in the leather, simulated leather or leather equivalent layer.

7. The intermediate article of manufacture forming the subassembly of claim 4 wherein said one or more securing means comprises one or more screws, pins or equivalent fastening or alignment means, each passing through said pliable component to secure said base layer to said locking structure.

8. The intermediate article of manufacture forming the subassembly of claim 1 further comprising a decorative component with a wood veneer or wood simulated printed pattern forming an exterior surface thereof affixed to an outer surface of the outer base structure.

9. The intermediate article of manufacture forming the subassembly of claim 8 further comprising a protective film on the exterior of at least said decorative component.

10. The intermediate article of manufacture forming the subassembly of claim 8 further comprising one or more boundary edge components, the boundary edge components being aligned adjacent an edge of the decorative component and being held between the decorative component and the leather, simulated leather or leather equivalent pliable component by the outer base structure.

* * * * *